United States Patent
Ishibashi et al.

(10) Patent No.: US 7,248,561 B2
(45) Date of Patent: Jul. 24, 2007

(54) PATH ESTABLISHMENT METHOD FOR ESTABLISHING PATHS OF DIFFERENT FAULT RECOVERY TYPES IN A COMMUNICATIONS NETWORK

(75) Inventors: Osamu Ishibashi, Tokyo (JP); Yoshihiko Suemura, Tokyo (JP)

(73) Assignee: NEC Corporation, Tokyo (JP)

( * ) Notice: Subject to any disclaimer, the term of this patent is extended or adjusted under 35 U.S.C. 154(b) by 952 days.

(21) Appl. No.: 10/355,169

(22) Filed: Jan. 31, 2003

(65) Prior Publication Data

US 2003/0147352 A1 Aug. 7, 2003

(30) Foreign Application Priority Data

Feb. 6, 2002 (JP) ............................. 2002-028902

(51) Int. Cl.
*H04L 1/00* (2006.01)
(52) U.S. Cl. .................... 370/228; 370/395.21
(58) Field of Classification Search ............... 370/216, 370/218, 227, 233, 237, 248, 250, 351, 360, 370/400, 228, 395.21; 398/17, 59; 709/235, 709/238, 239
See application file for complete search history.

(56) References Cited

U.S. PATENT DOCUMENTS

| | | | | | |
|---|---|---|---|---|---|
| 5,502,714 | A | * | 3/1996 | Sallberg | ................. 370/351 |
| 5,838,663 | A | * | 11/1998 | Elwalid et al. | ............. 370/233 |
| 6,594,268 | B1 | * | 7/2003 | Aukia et al. | ................. 370/400 |
| 6,895,441 | B1 | * | 5/2005 | Shabtay et al. | ............. 709/238 |

FOREIGN PATENT DOCUMENTS

| | | |
|---|---|---|
| CN | 1314749 | 9/2001 |
| WO | WO 97/06645 | 2/1997 |
| WO | WO 00/60772 | 10/2000 |

OTHER PUBLICATIONS

E. Mannie et al., "Generalized Multi-Protocol Label Switching (GMPLS) Architecture," draft-ietf-ccamp-gmpls-architecture-01. txt, internet draft, Nov. 2001.
G. Li et al., "RSVP-TE Extensions for Shared-Mesh Restoration in Transport Network," draft-li-shared-mesh-restoration-01.txt, Nov. 2001.

* cited by examiner

*Primary Examiner*—Kwang Bin Yao
*Assistant Examiner*—Pao Sinkantarakorn
(74) *Attorney, Agent, or Firm*—Young & Thompson

(57) ABSTRACT

In a communications network where multiple shared risk link groups are formed by links having a common risk, unreserved bandwidths are defined corresponding to all SRLG's and a maximum bandwidth of each link is set as an initial value of each of the defined unreserved bandwidths when a working path or a protection path of "1+1" or "1:1" recovery type is requested. When a protection path of "shared" recovery type is requested, unreserved bandwidths are defined corresponding to the SRLG's to which the links of its corresponding working path belong and a maximum bandwidth of each link is set as an initial value to each of the defined unreserved bandwidths. The bandwidth of the working or protection path is subtracted from each of the unreserved bandwidths. The request is rejected if a minimum of the subtracted values is smaller than a threshold.

20 Claims, 27 Drawing Sheets

FIG. 3
PORT TABLE (NODE A)

| PORT ID | I/C or O/G | NEIGHBOR NODE ID | REMOTE PORT ID | IDLE/BUSY STATUS | PATH ID | RECOVERY TYPE |
|---|---|---|---|---|---|---|
| $a_0$ | I/C | B | $a_1$ | I | | |
| $b_0$ | I/C | B | $b_1$ | I | | |
| $c_0$ | I/C | B | $c_1$ | I | | |
| $d_0$ | I/C | B | $d_1$ | I | | |
| $e_0$ | I/C | C | $a_1$ | B | 301 | 1+1 |
| $f_0$ | I/C | C | $b_1$ | I | | |
| $g_0$ | I/C | C | $c_1$ | I | | |
| $h_0$ | I/C | C | $d_1$ | I | | |
| $i_0$ | I/C | D | $a_1$ | B | 311 | 1+1 |
| $j_0$ | I/C | D | $b_1$ | I | | |
| $k_0$ | I/C | D | $c_1$ | I | | |
| $l_0$ | I/C | D | $d_1$ | I | | |
| $m_0$ | I/C | CLIENT | — | B | 302 | SHARED |
| $n_0$ | I/C | CLIENT | — | B | 303 | ET |
| $a_1$ | O/G | B | $a_0$ | B | 302 | SHARED |
| $b_1$ | O/G | B | $b_0$ | I | | |
| $c_1$ | O/G | B | $c_0$ | I | | |
| $d_1$ | O/G | B | $d_0$ | I | | |
| $e_1$ | O/G | C | $a_0$ | I | | |
| $f_1$ | O/G | C | $b_0$ | I | | |
| $g_1$ | O/G | C | $c_0$ | I | | |
| $h_1$ | O/G | C | $d_0$ | I | | |
| $i_1$ | O/G | D | $a_0$ | B | 303 | ET |
| $j_1$ | O/G | D | $b_0$ | I | | |
| $k_1$ | O/G | D | $c_0$ | I | | |
| $l_1$ | O/G | D | $d_0$ | I | | |
| $m_1$ | O/G | CLIENT | — | B | 301<br>311 | 1+1<br>1+1 |
| $n_1$ | O/G | CLIENT | — | I | | |

NOTE: OUTGOING PROTECTION PATH OF SHARED TYPE (i.e., 312) IS NOT INDICATED BECAUSE NO LABEL (PORT NUMBER) IS ASSIGNED AT INITIAL SETTING

FIG. 4  PATH TABLE (NODE A)

| TUNNEL ID | PATH ID | PATH BANDWIDTH (P/BW) | UPSTREAM NODE ID | UPSTREAM LABEL | DOWN-STREAM NODE ID | DOWN-STREAM LABEL | RECOVERY TYPE | WORKING/PROTECTION |
|---|---|---|---|---|---|---|---|---|
| 1 | 301 | STS-192 | C | $e_0$ | CLIENT | $m_1$ | 1+1 | WORKING |
| 1 | 311 | STS-192 | D | $i_0$ | CLIENT | $m_1$ | 1+1 | PROTECTION |
| 2 | 302 | STS-192 | CLIENT | $m_0$ | B | $a_1$ | SHARED | WORKING |
| 2 | *312 | STS-192 | CLIENT | — | D | — | SHARED | PROTECTION |
| 3 | 303 | STS-192 | CLIENT | $n_0$ | D | $i_1$ | ET | WORKING |

* AT INITIAL SETTING, NO LABEL (PORT) IS ASSIGNED TO OUTGOING PROTECTION PATH OF SHARED TYPE

FIG. 5  LINK TABLE (NODE A)

| LINK ID | NEIGHBOR NODE ID | MAXIMUM BANDWIDTH | SRLG ID | UNRESERVED BANDWIDTH (URBW (i)) | UNASSIGNED BANDWIDTH (UABW) | ASSIGNED SHARED PROTEC. BDWTH (ASPBW) | BANDWIDTH OF EXTRA TRAFFIC (ET/BW) |
|---|---|---|---|---|---|---|---|
| AB | B | STS-768 | G1 | Max{URBW (i)} = STS-576 | STS-576 | 0 | 0 |
| AC | C | STS-768 | G2 | Max{URBW (i)} = STS-768 | STS-768 | 0 | 0 |
| AD | D | STS-768 | G2 | Max{URBW (i)} = STS-768<br>URBW(G1) = STS-576<br>URBW(G6) = STS-576 | STS-768 | 0 | STS-192 |

INTERMEDIATE NODE (RESERVATION REQUEST ROUTINE)

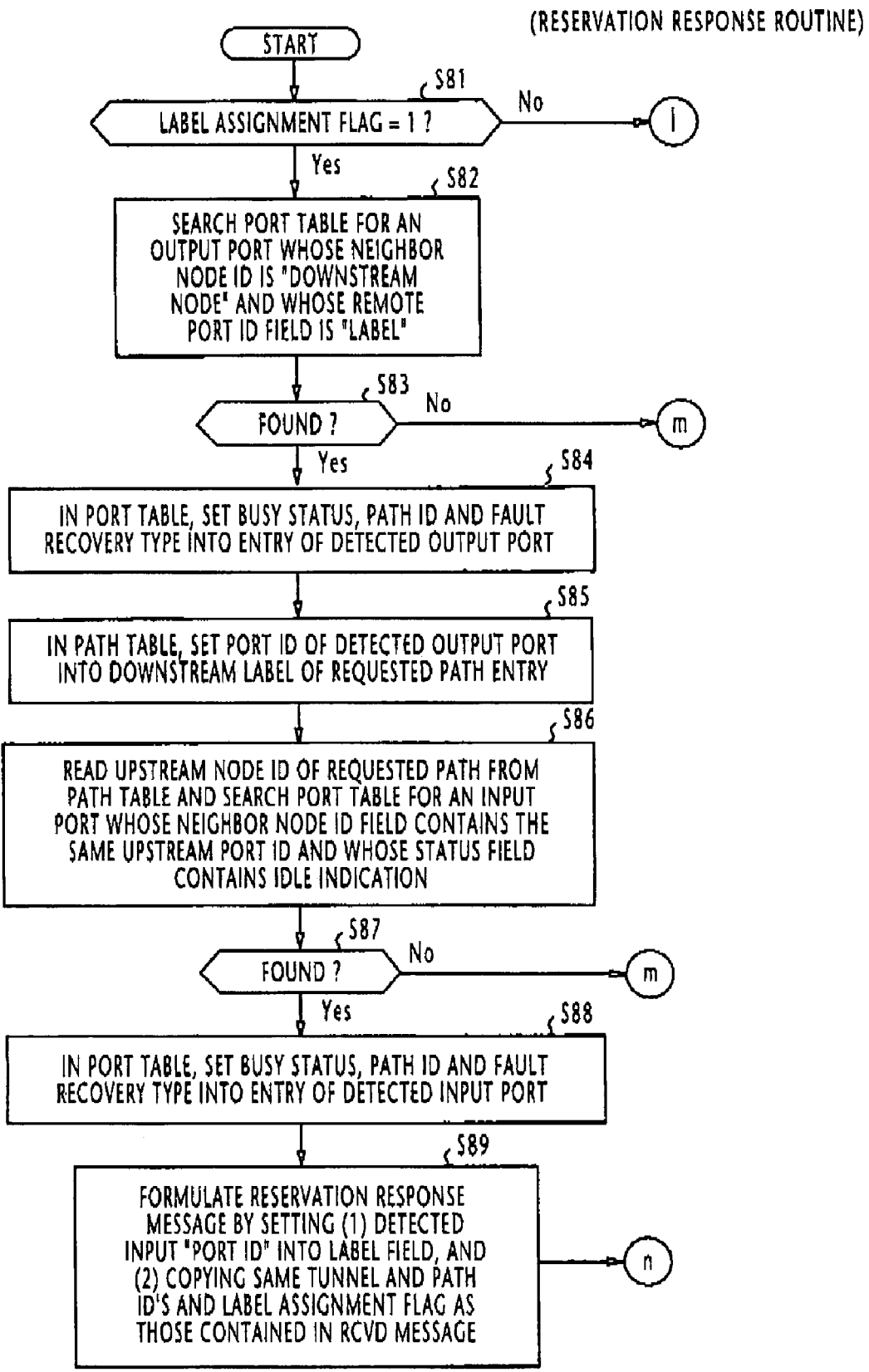
FIG. 11A — INTERMEDIATE NODE (RESERVATION RESPONSE ROUTINE)

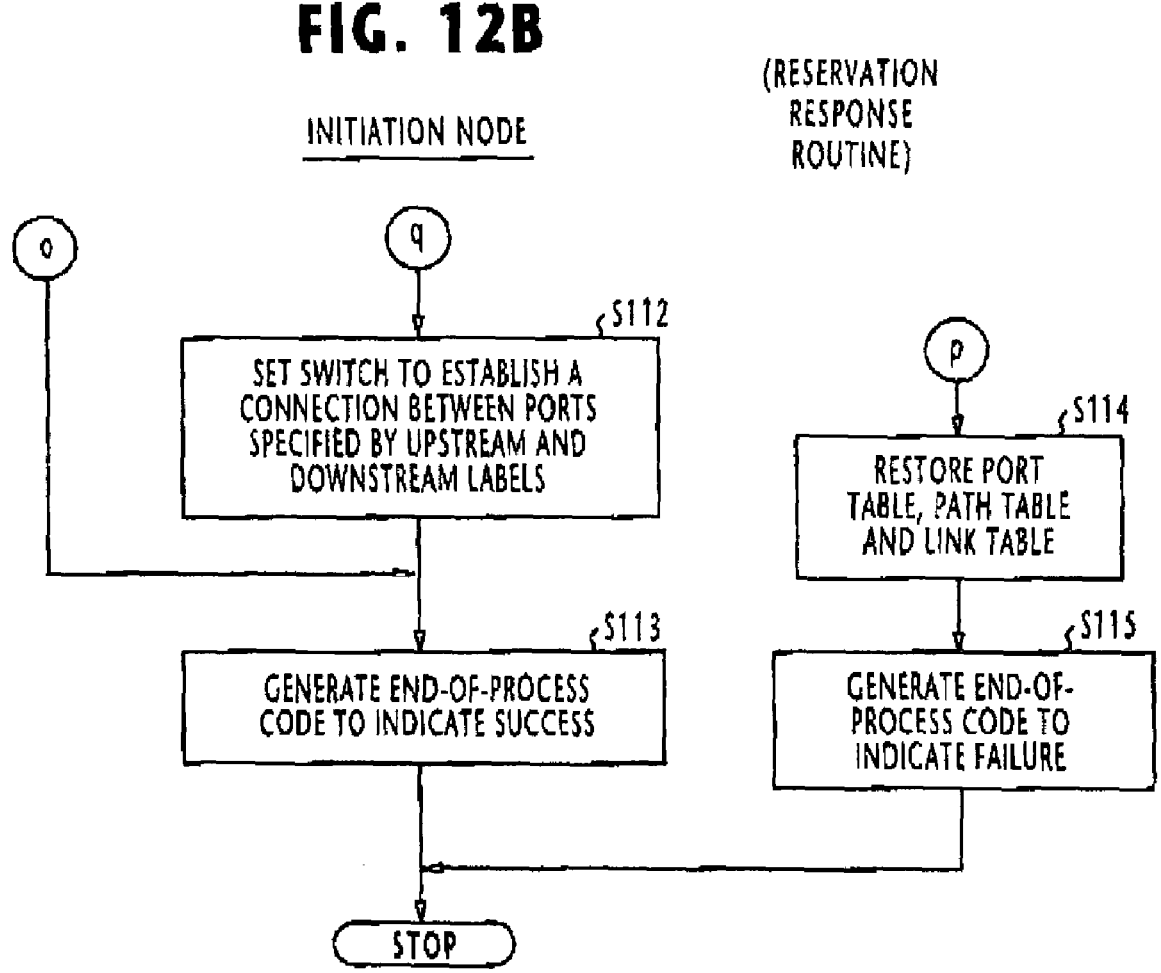

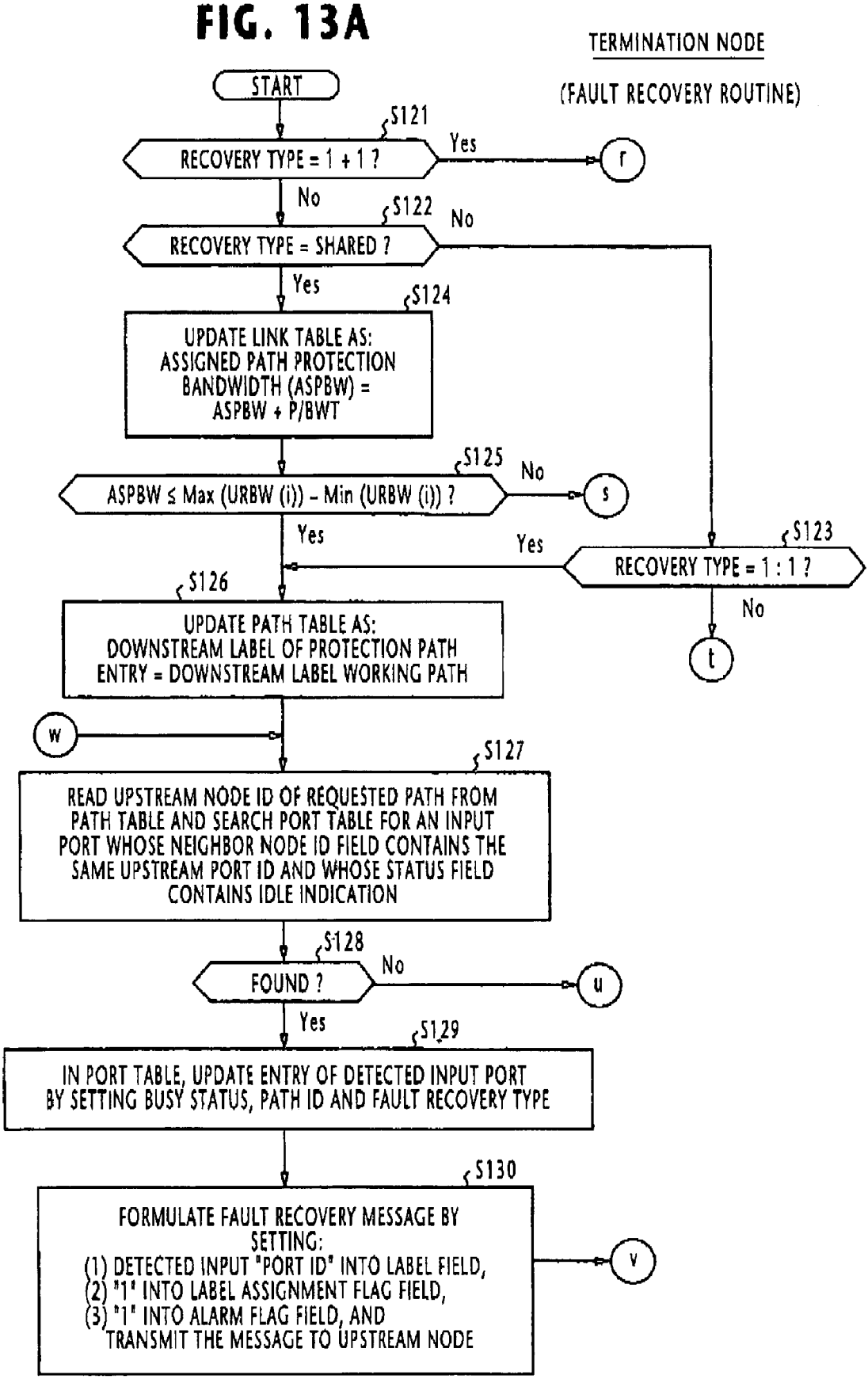

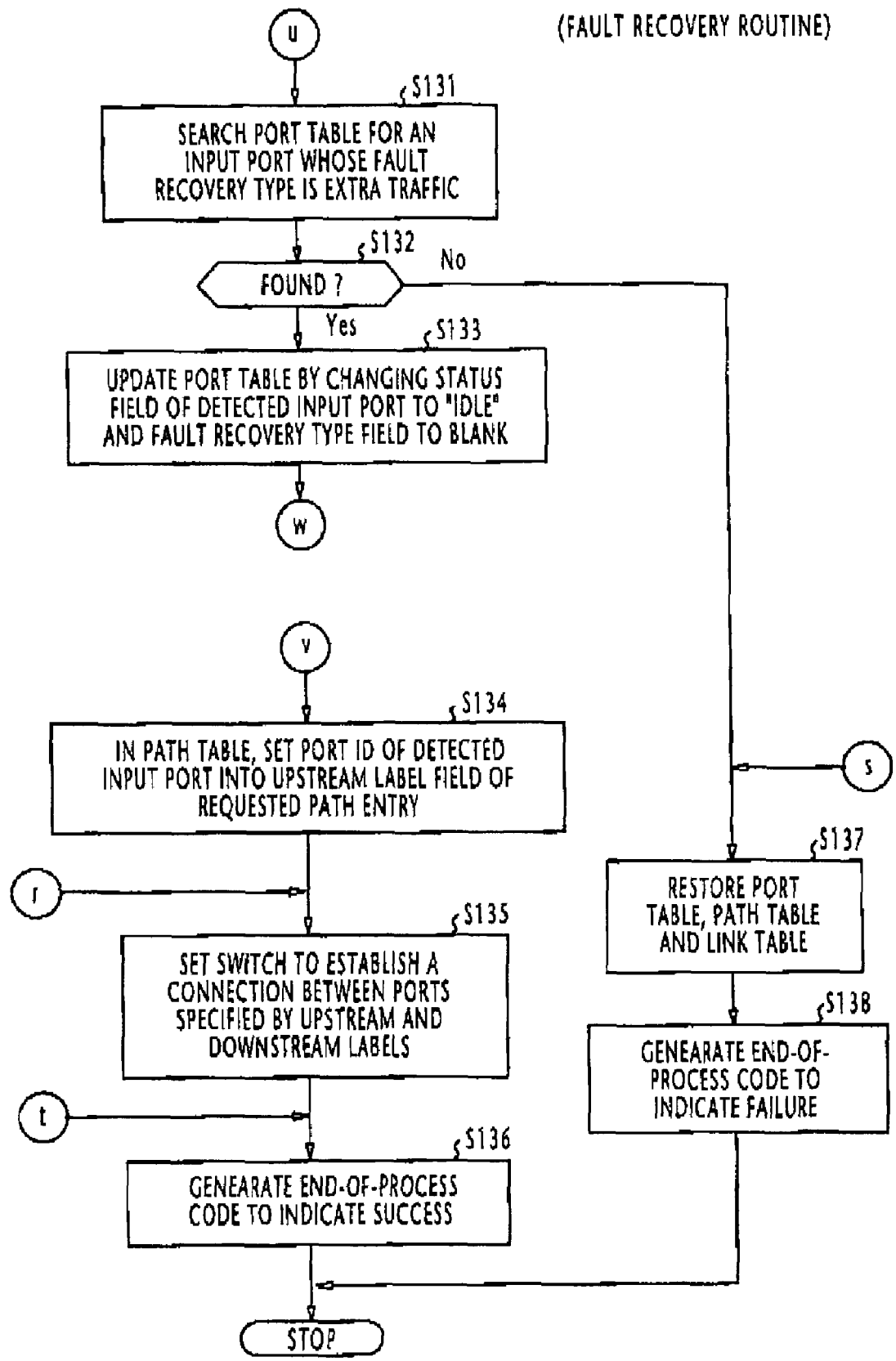

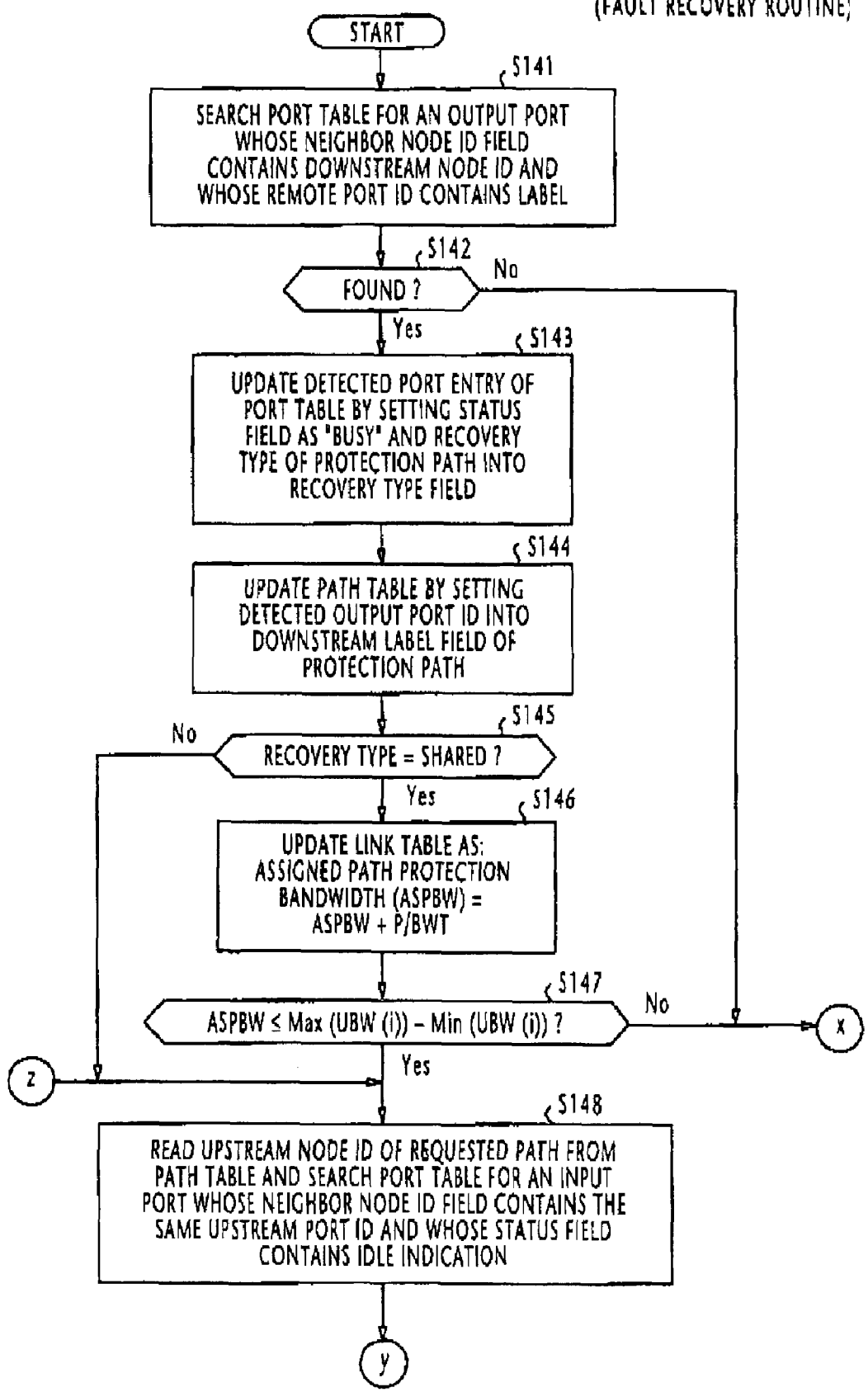
FIG. 14A — INTERMEDIATE NODE (FAULT RECOVERY ROUTINE)

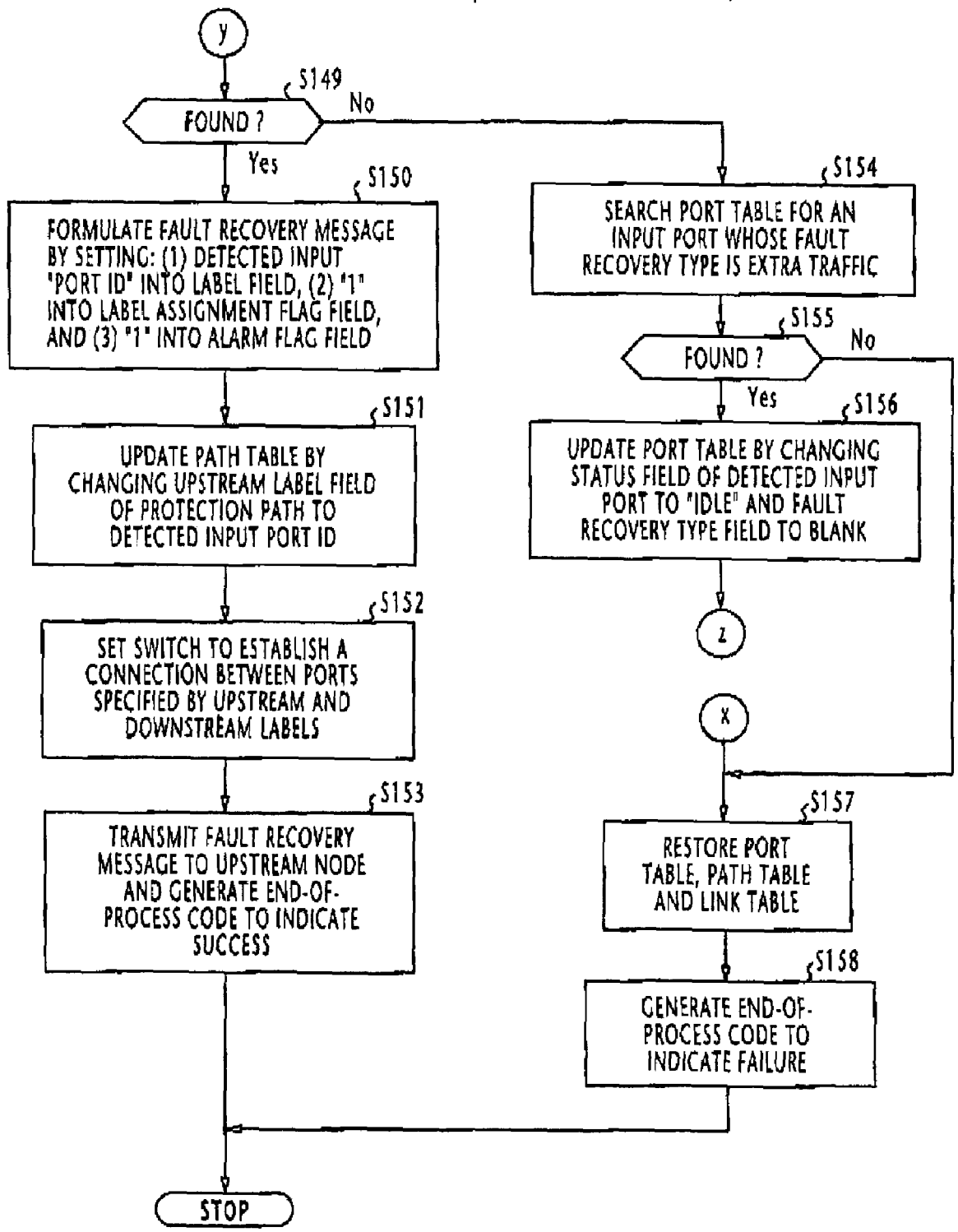
FIG. 14B  INTERMEDIATE NODE (FAULT RECOVERY ROUTINE)

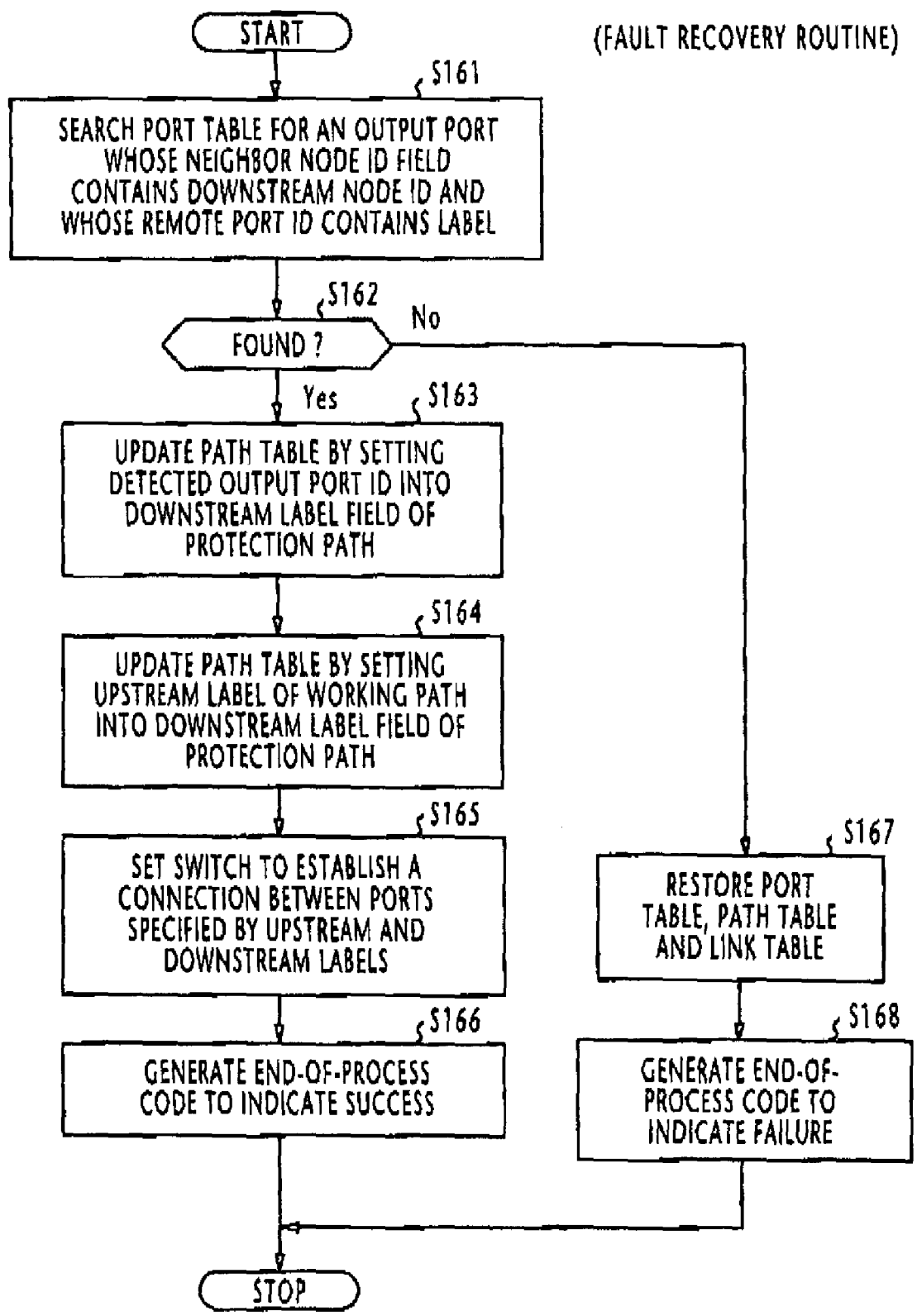

LEGEND:
—— LINK
→ WORKING PATH
--→ PROTECTION PATH
-·-→ EXTRA TRAFFIC PATH

FAULT RECOVERY TYPE
(AND BANDWIDTH):
W/PATH 301 = 1 + 1 (STS-1)
P/PATH 311 = 1 + 1 (STS-1)
W/PATH 302 = SHARED (STS-3)
P/PATH 312 = SHARED (STS-3)
ET/PATH 303 = STS-1

FIG. 18  PORT TABLE (NODE A)

| PORT ID | I/C or O/G | NEIGHBOR NODE ID | REMOTE PORT ID | STS-1 NO. | IDLE/BUSY STATUS | PATH ID | RECOVERY TYPE |
|---|---|---|---|---|---|---|---|
| $a_0$ | I/C | B | $a_1$ | 0 | I | | |
| | | | | 1 | I | | |
| | | | | ⋮ | ⋮ | | |
| | | | | 11 | I | | |
| $b_0$ | I/C | C | $b_1$ | 0 | B | 301 | 1+1 |
| | | | | 1 | I | | |
| | | | | ⋮ | ⋮ | | |
| | | | | 11 | I | | |
| $c_0$ | I/C | D | $c_1$ | 0 | I | 311 | 1+1 |
| | | | | 1 | I | | |
| | | | | ⋮ | I | | |
| | | | | 11 | I | | |
| $m_0$ | I/C | CLIENT | — | 0 | B | 302 | SHARED |
| | | | | 1 | B | 302 | SHARED |
| | | | | 2 | B | 302 | SHARED |
| | | | | 3 | B | 303 | ET |
| | | | | 4 | I | | |
| | | | | ⋮ | ⋮ | | |
| | | | | 11 | I | | |
| $a_1$ | O/G | B | $a_0$ | 0 | B | 302 | SHARED |
| | | | | 1 | B | 302 | SHARED |
| | | | | 2 | B | 302 | SHARED |
| | | | | 3 | I | | |
| | | | | ⋮ | ⋮ | | |
| | | | | 11 | I | | |
| $b_1$ | O/G | C | $b_0$ | 0 | I | | |
| | | | | ⋮ | ⋮ | | |
| | | | | 11 | I | | |
| $c_1$ | O/G | CLIENT | $a_0$ | 0 | B | 303 | ET |
| | | | | 1 | I | | |
| | | | | ⋮ | ⋮ | | |
| | | | | 11 | I | | |
| $m_1$ | O/G | CLIENT | — | 0 | B | 301 / 311 | 1+1 / 1+1 |
| | | | | 1 | I | | |
| | | | | ⋮ | ⋮ | | |
| | | | | 11 | I | | |

FIG. 19 PATH TABLE (NODE A)

| TUNNEL ID | PATH ID | PATH BANDWIDTH (P/BW) | UPSTREAM NODE ID | UPSTREAM LABEL PORT NO. | UPSTREAM LABEL STS-1 NO. | DOWN-STREAM NODE ID | DOWNSTREAM LABEL PORT NO. | DOWNSTREAM LABEL STS-1 NO. | RECOVERY TYPE | WORKING/ PROTECTION |
|---|---|---|---|---|---|---|---|---|---|---|
| 1 | 301 | STS-1 | C | $b_0$ | 0 | CLIENT | $m_1$ | 0 | 1+1 | W |
| 1 | 311 | STS-1 | D | $c_0$ | 0 | CLIENT | $m_1$ | 0 | 1+1 | P |
| 2 | 302 | STS-3 | CLIENT | $m_0$ | 0 | B | $a_1$ | 1 | SHARED | W |
| 2 | 312 | STS-3 | CLIENT | — | — | D | — | — | SHARED | P |
| 3 | 303 | STS-1 | CLIENT | $m_0$ | 3 | D | $c_1$ | 0 | ET | W |

FIG. 20 LINK TABLE (NODE A)

| LINK ID | NEIGHBOR NODE ID | MAXIMUM BANDWIDTH | SRLG ID | UNRESERVED BANDWIDTH (URBW (i)) | NO. OF UNASSIGNED PROTECTION PATHS (UAPP) | UNASSIGNED BANDWIDTH (UABW) | ASSIGNED SHARED PROTEC. BDWTH (ASPBW) | BANDWIDTH OF EXTRA TRAFFIC (ET/BW) |
|---|---|---|---|---|---|---|---|---|
| AB | B | STS-12 | G1 | Max(URBW(i)) = STS-9 | 0 | STS-9 | 0 | 0 |
| AC | C | STS-12 | G2 | Max(URBW(i)) = STS-12 | 0 | STS-12 | 0 | 0 |
| AD | D | STS-12 | G2 | Max(URBW(i)) = STS-12 URBW(G1) = STS-9 URBW(G6) = STS-9 | 1 (=STS-3) 1 (=STS-3) | STS-12 | 0 | STS-1 |

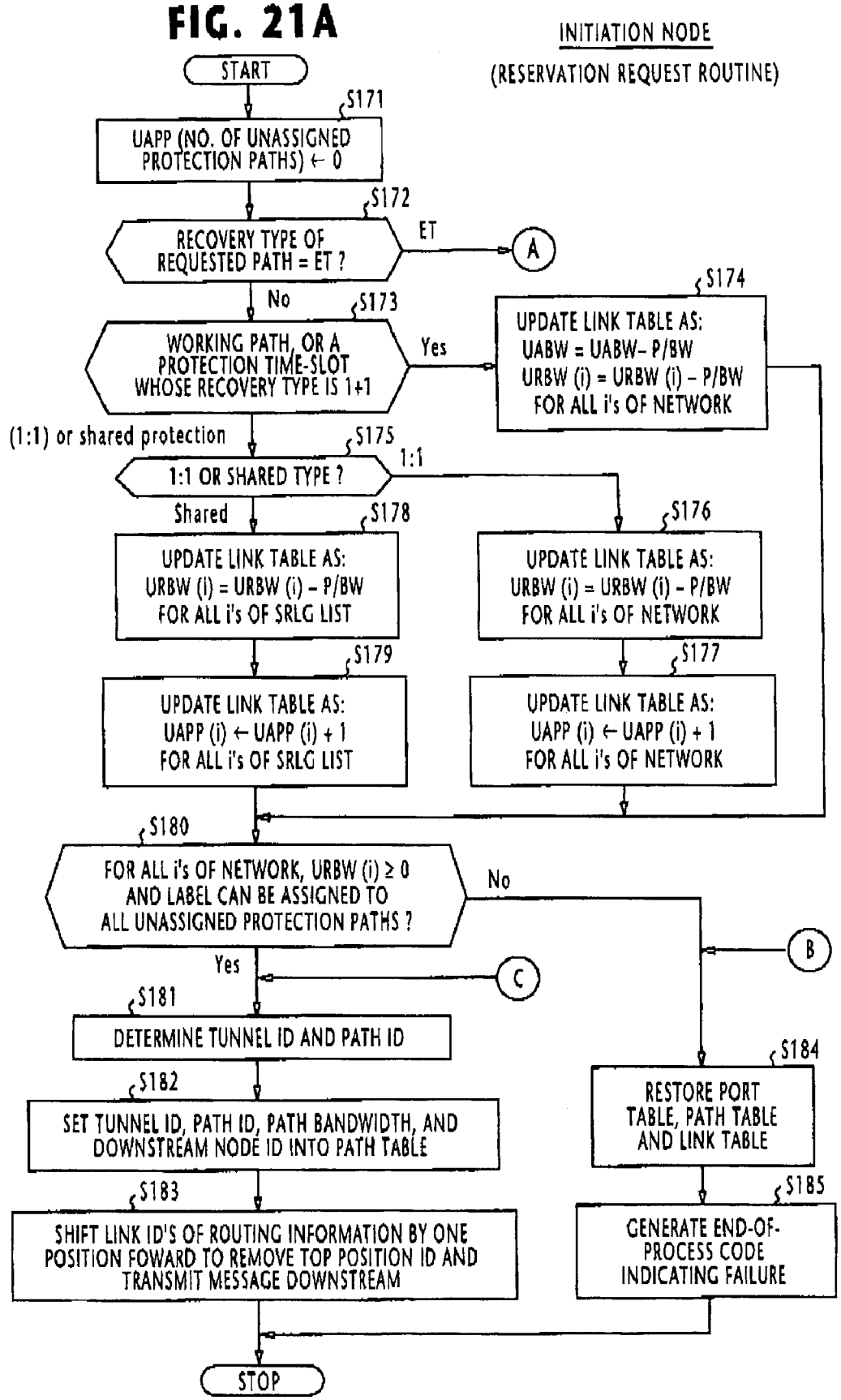

INITIATION NODE (RESERVATION REQUEST ROUTINE)

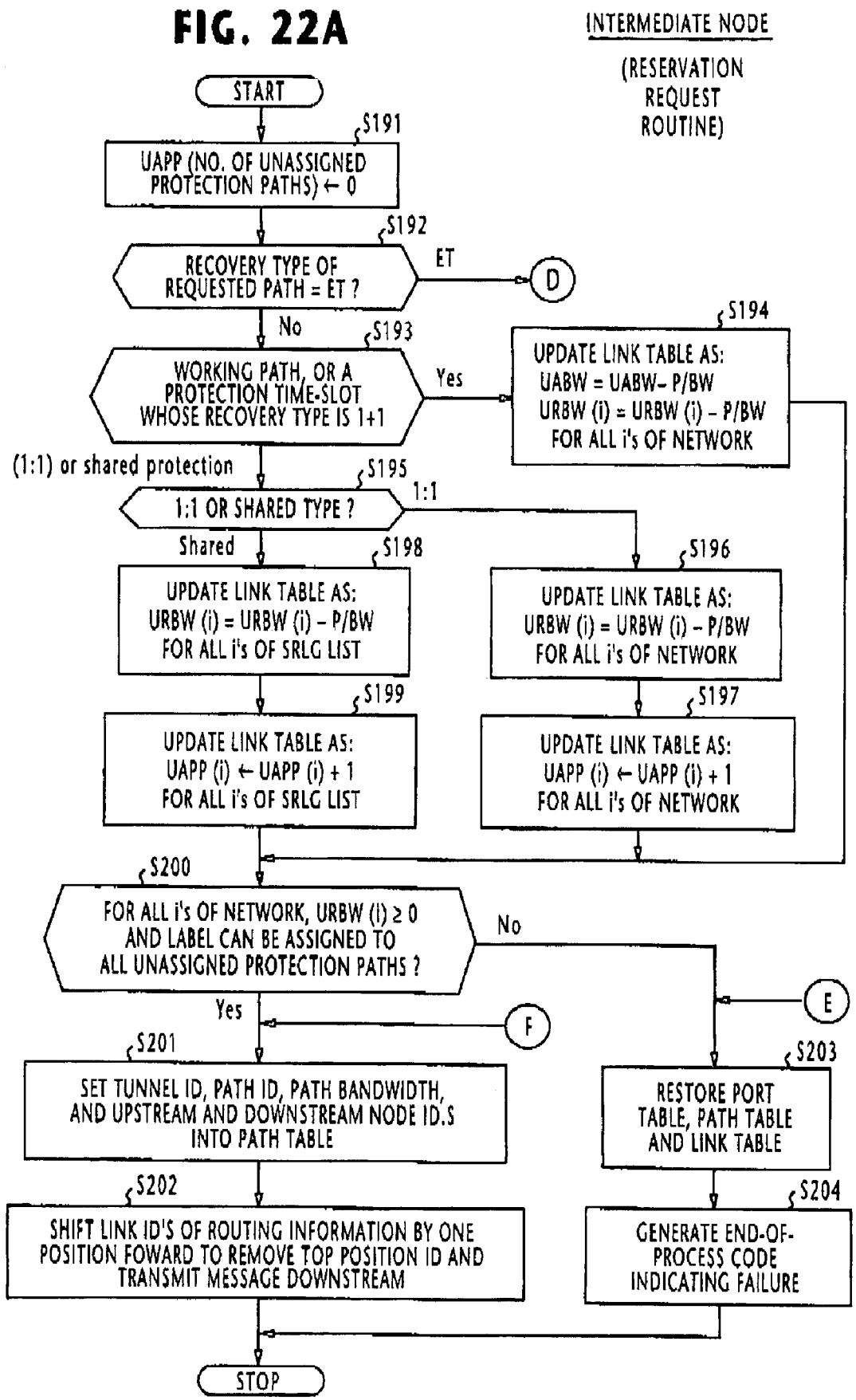

INTERMEDIATE NODE (RESERVATION REQUEST ROUTINE)

PATH ESTABLISHMENT METHOD FOR ESTABLISHING PATHS OF DIFFERENT FAULT RECOVERY TYPES IN A COMMUNICATIONS NETWORK

BACKGROUND OF THE INVENTION

1. Field of the Invention

The present invention relates generally to fault recovery methods, and more particularly to a path establishment method for a meshed network that can be recovered from failure using different fault recovery types.

2. Description of the Related Art

In a public communication network, fault recovery is an indispensable task. Meshed network configuration has met with wide acceptance because of its versatile fault recovery features. A fault recovery method using GMPLS (Generalized Multi-Protocol Label Switching) technology in a mesh network is described in an Internet Draft "Generalized Multi-Protocol Label Switching (GMPLS) Architecture", draft-ietf-ccamp-gmpls-architecture-01.txt which Eric Mannie submitted in IETF (Internet Engineering Task Force) (hereinafter Document 1). According to Document 1, chapter 12, a fault recovery method is classed in protection and restoration modes. In the protection mode, a failure is restored by allocating a backup resource well in advance of a possible failure and with this pre-allocation no signaling procedure is required. The fault section is simply restored by operating a switch. On the other hand, the restoration mode is one in which no backup resources are allocated in advance. When a failure occurs, signaling is used to exchange messages between the edge points of the fault section in order to allocate a backup resource for restoration. The fault recovery is classified between a link-by-link recovery method and a recovery method based on a per LSP (Label Switched Path) which is identified by a label in a GMPLS network. Furthermore, the fault recovery method is classified according to the redundancy of backup resources into "1+1", "1:1" "1:N" and "M:N" in that order. Recovery type "1+1" is usually applied to the protection mode in which a protection resource is allocated to a working resource and the signal of the working resource is also supplied at the upstream end of the protection resource. When the working resource fails, the downstream end of the protection resource is switched to pass the signal downstream. Recovery type "1:1" is applied to both protection and restoration modes. In this type of recovery, a protection resource is allocated to a working resource. However, the signal is not supplied to the protection resource. When the working resource fails, both the upstream and downstream ends of the protection resource are switched to carry the signal. When the working resource is normal, the protection resource is used to carry an extra traffic. This extra traffic is shut down when the protection resource is switched in to carry the main signal. Recovery type "1:N" is also applied to both protection and restoration modes. This recovery type differs from "1:1" recovery type in that N protection resources are shared by a single working resource. Recovery type "M:N" is a special case of recovery types "1:1" and "1:N", and when N is more than one, the recovery type M:N is called "Shared". By setting N larger than M, resource utilization efficiency can be enhanced. However, simultaneous occurrences of failures in both working and protection resources means that the system cannot be recovered and hence it is necessary to guarantee that probability of fault occurrences in the protection resources is significantly low.

In order to guarantee that shared resources have a low fault occurrence rate, a concept of shared risk link group (SRLG) has been introduced. In a wavelength multiplex network, wavelength channels that share the same optical fiber, or optical fibers that share the same cable, or optical fibers connected to the same node, are treated as a common SRLG and identified uniquely in a network by an SRLG identifier. There may be instances where a single link belongs to a number of different SRL groups.

In a GMPLS network, a list of SRLG identifiers is maintained for each link of the network that belongs to the SRL groups of the list. Two paths are said to be SRLG-disjoint if their links belong to different sets of shared risk link groups in each of which any one of the links do not overlap any one of the other group. If one of the SRL groups fails, the SRLG-disjoint paths never fail simultaneously.

Shared restoration for restoring a single SRLG failure by using GMPLS is disclosed in internet draft submitted to IETF "RSVP-TE Extensions for Shared-Mesh Restoration in Transport Network", draft-li-shared-mesh-restoration-01.txt (Document 2), Guangzhi Li et al. According to Document 1, Document 2 can be classified under "End-to-end LSP restoration with pre-signaled recovery bandwidth reservation and no label pre-selection".

According to Document 2, when a path setup request is generated, the network calculates a pair of SRLG-disjoint working and protection paths. A signaling message is then transmitted through the network. In this process, bandwidth reservation is performed for both working and protection paths. However, label assignment and connection establishment are performed only on the working path. If the working path fails, a signaling message will be transmitted along the route of the reserved protection path to perform label assignment and connection establishment. In order to guarantee fault recovery of a single SRL group, two techniques are used in this prior art. One is to append a list of SRLG identifiers to a signaling message for establishing the protection path. In this list, all SRL groups to which the links of the working path belong are indicated. The other is to manage the reservation bandwidth of each link with a reservation array R [i] (where i represents SRLG ID) for each SRL group. The management of a reservation array R [i] is essentially the management of a protection path according to different SRL groups of the working path. Specifically, if a working path of a 10-Gbps bandwidth uses links that belong to a list of shared risk link groups identified by SRLG ID's 1, 3, 5, a list of SRLG identifiers 1, 3 and 5 is appended to a signaling message when establishing a protection path when that working path fails. Nodes along the route of the protection path adds 10 Gbps to the links R [1], R [3] and R [5] of the protection path. If the maximum value Max (R [i]) is greater than the maximum bandwidth of the links, the protection path is not established. Since R [i] represents the bandwidth required for a link that belongs to SRLG ID=i, a single SRLG failure can be restored in so far as Max (R [i]) is smaller than the maximum bandwidth of the link. This recovery method can be classified as a shared recovery type M:N, since all protection paths that pass through a link share the same bandwidth of Max (R [i]).

To seek a shortest path in GMPLS, use is made of a route calculation algorithm known as CSPF (Constrained Shortest Path First) which applies the Dijkstra algorithm to a set of links that satisfy a set of constraints, such as SRLG disjoint between working and protection paths and a constraint that a link whose unreserved bandwidth be greater than the bandwidth of a path. Application of a constraint guarantees that a required bandwidth can be secured on each link of a calculated route. According to Document 2, the maximum value R [i] is the whole bandwidth reserved by protection paths. By subtracting the bandwidths assigned to both working and protection paths from the bandwidth of a link, unreserved bandwidth can be determined.

However, the prior art route calculation and fault recovery algorithms do not allow a number of communication channels of different fault recovery types to be accommodated in a single communications network for a number of reasons. For example, fault recovery type 1+1 allows fast recovery from failure, but it needs the same amount of backup resource for a protection path as that of its working path and does not allow the protection path to carry extra traffic. Shared recovery type, though taking a longer time than 1+1 to recover and not capable of recovering from multiple failures, allows backup resources to be shared among working resources and extra traffic to be accommodated. Shared recovery type has the highest resource utilization efficiency. Since the grade of service as represented by the fault recovery time and the recovery rate contradicts with resource utilization efficiency, the prior art has employed different fault recovery types for different grades of service.

If a number of different fault recovery types coexist in a single network, there is a need to perform priority control. The 1+1 recovery type is assigned higher priority over 1:1, which should be assigned higher priority over the shared type, and if multiple failures should occur, fault recovery should be performed in that order.

Another problem is that the constraint route calculation algorithm is not appropriate for extra traffic since it can result in a situation where extra traffic is set up over links where 1:1 or shared type protection paths are not established.

In the fault recovery aspect of a communications network, time-slot fragmentation is still another problem. A path cannot be established on a TDM link if the bandwidth of this path is greater than that of each of fragmented time-slots. For fault recovery purposes, fragmented time-slots cannot be concatenated. In Document 2, R [i] is managed on a link-by-link basis and a protection path is established on a link if the maximum value of R [i] does not exceed some threshold which is equal to the difference between the bandwidth of the link and the bandwidth of a working path accommodated in the link. If time-slot fragmentation occurs on a TDM link, a protection path cannot be established on the link in the event of a failure even if the maximum value of R [i] is lower than the threshold value.

SUMMARY OF THE INVENTION

It is therefore an object of the present invention to provide a path establishment method for accommodating paths of a plurality of different fault recovery types in a single communications network.

It is another an object of the present invention to provide a path establishment method for performing a fault recovery process whereby failed paths of different fault recovery types are recovered from failure according to priorities given to the recovery types in a descending order of reliability.

It is a further object of the present invention to provide a path establishment method capable of calculating an appropriate route for a path of extra-traffic (unprotected) recovery type.

It is a still further object of the present invention to provide a path establishment method that avoids unsuccessful fault-recovery which can occur as a result of fragmented time-slots.

According to a first aspect of the present invention, there is provided a path establishment method for a communications network, wherein the network comprises a plurality of nodes interconnected by links, the links having a shared risk to form a shared risk link group which is one of a plurality of shared risk link groups of the network. The method comprises (a) defining a plurality of unreserved bandwidths respectively corresponding to the shared risk link groups and setting a maximum bandwidth of each link to each of the defined unreserved bandwidths as an initial value, and (b) subtracting the bandwidth of a requested path (i.e., wavelength path) from each of the unreserved bandwidths and rejecting the establishment of the requested path if each of the subtracted unreserved bandwidths is smaller than a predetermined threshold value.

According to a second aspect, the present invention provides a path establishment method for a communications network, wherein the network comprises a plurality of nodes interconnected by links, and wherein a plurality of shared risk link groups are formed by the links having a common risk. The method comprises (a) when a working path or a protection path of "1+1" or "1:1" recovery type is requested, defining a plurality of unreserved bandwidths respectively corresponding to all shared risk link groups of the network and setting a maximum bandwidth of each link to each of the defined unreserved bandwidths as an initial value, (b) when a protection path of "shared" recovery type is requested, defining a plurality of unreserved bandwidths respectively corresponding to the shared risk link groups to which links of a corresponding working path belong and setting a maximum bandwidth of each link to each of the defined unreserved bandwidths as an initial value, and (c) subtracting the bandwidth of the working or protection path from each of the unreserved bandwidths and rejecting the establishment of the requested path if a minimum value of the subtracted unreserved bandwidths is smaller than the predetermined threshold value.

If the fault recovery type of the working path is the extra traffic type, the method of the present invention further performs summing the bandwidth of the working path to a bandwidth of the extra traffic to produce a sum, subtracting the minimum value of the unreserved bandwidths from an unassigned bandwidth of each link to produce a difference, and rejecting the establishment of the extra traffic if the sum is smaller than the difference.

When a failure is detected on a working path, the method determines whether there is a sufficient bandwidth on each of the links to be assigned to a protection path which forms a pair with the working path. If a sufficient bandwidth is not present, a decision is made as to whether an extra traffic is established on each link. If an extra traffic is established on each link, the extra traffic is deleted to increase the bandwidth of each link that can be assigned to the protection path.

According to a further aspect of the present invention, a link state advertisement message is broadcast from an initiation node for indicating an unassigned bandwidth for extra traffic which is equal to UABW−Min (URBW (i))−ET/BW, where, UABW=an unassigned bandwidth of each link, $$\mathrm{Min}(URBW(i)) = \text{a minumum value}$$
of the unreserved bandwidths respectively
corresponding to all shared risk link groups, and ET/BW=the bandwidth of the extra traffic.

In response to the link state advertisement message, a route calculation is performed by using links on each of which the unassigned bandwidth indicated in the link state advertisement message is greater than the bandwidth of a working path established on each of the links.

According to a still further aspect, the present invention provides a method that defines a count number representing a combination of one of the shared risk link groups and the bandwidth of a protection path and initially sets zero to the count number, wherein each working and protection path is a TDM path. If a protection path of either 1+1 or 1:1 recovery type is requested, the method adds 1 to the count number of each shared risk link group of the network at each link of the requested protection path to produce a sum, and rejects the establishment of the requested protection path if the sum is greater than a count number which can be accommodated on each of the links. If a protection path of shared type is requested, the method adds 1 to the count number of a list of the shared risk link groups to which links of its corresponding working path belong to produce a sum, and rejects the establishment of the requested protection path if the sum is greater than a count number which can be accommodated on each of the links of the corresponding working path.

BRIEF DESCRIPTION OF THE DRAWINGS

The present invention will be described in detail further with reference to the following drawings, in which:

FIG. 3 is an illustration of a port table of node A defined in the memory of the node controller of FIG. 2;

FIG. 4 is an illustration of a path table of node A defined in the memory of the node controller of FIG. 2;

FIG. 5 is an illustration of a link table of node A defined in the memory of the node controller of FIG. 2;

FIGS. 11A and 11B are a flowchart of the operation of the node controller of the intermediate node for retransmitting the reservation request message to the initiation node;

FIGS. 12A and 12B are a flowchart of the operation of the node controller of the initiation node when a reservation request message is received;

FIGS. 13A and 13B are a flowchart of the operation of the node controller of the termination node when the node formulates and transmit a fault recovery message toward the initiation node when a failure occurs on an upstream link;

FIGS. 14A and 14B are a flowchart of the operation of the node controller of the intermediate node when a fault recovery message is received;

FIG. 15 is a flowchart of the operation of the node controller of the initiation node when a fault recovery message is received;

FIG. 18 is an illustration of a port table according to a second embodiment of the present invention;

FIG. 19 is an illustration of a path table according to a second embodiment of the present invention;

FIG. 20 is an illustration of a link table according to a second embodiment of the present invention;

FIGS. 21A and 21B are flowchart of the operation of an initiation node of FIG. 16 when transmitting a reservation request message according to the second embodiment of the present invention; and FIGS. 22A and 22B are flowchart of the operation of an intermediate node of FIG. 16 when retransmitting a reservation request message according to the second embodiment of the present invention.

DETAILED DESCRIPTION

Figure 1:
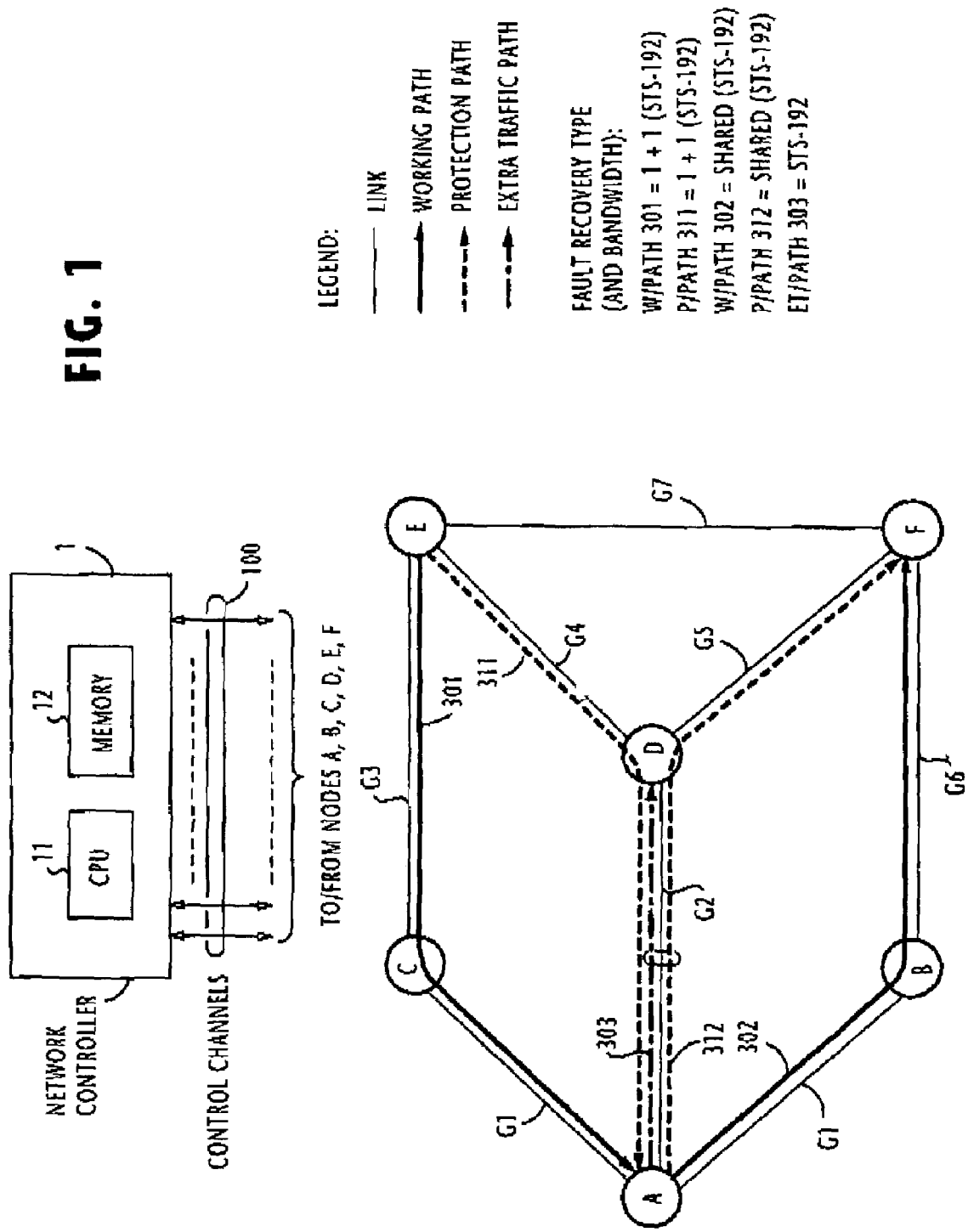
FIG. 1 is a block diagram of an optical communications network of the present invention.

Referring now to FIG. 1, an optical communication network of a first embodiment of this invention comprises a network controller 1 and a plurality of nodes A to F interconnected by links in a meshed configuration. For example, nodes A and B are interconnected by a link AB in the direction from node A to node B and a link BA in the direction from node B to node A. In this embodiment, it is assumed that a path is established in a single direction from an initiating node to a terminating node. All links are indicated by SRLG (shared risk link group) identifiers G1 to G7. A bundle of links that are grouped under the same G1, for example, include links AB, BA, AC and CA. All nodes are connected via control channels 100 to the network controller 1, which includes a CPU 11 and a memory 12.

One typical example of a configuration of working paths and protection paths established in the network of FIG. 1. It is assumed that a working path 301 of recovery type "1+1" is established between nodes A and E via node C and a protection path 311 is established as a backup of path 301 via node D. A working path 302 of "shared" recovery type is established between nodes A and F via node B and a protection path 312 is established as a backup of path 302 via node D. Between nodes A and D, an extra-traffic (ET) path is established by using the bandwidth the shared-recovery type protection path 312. Note that this working path has no corresponding protection path and hence this working path is unprotected.

Figure 2:
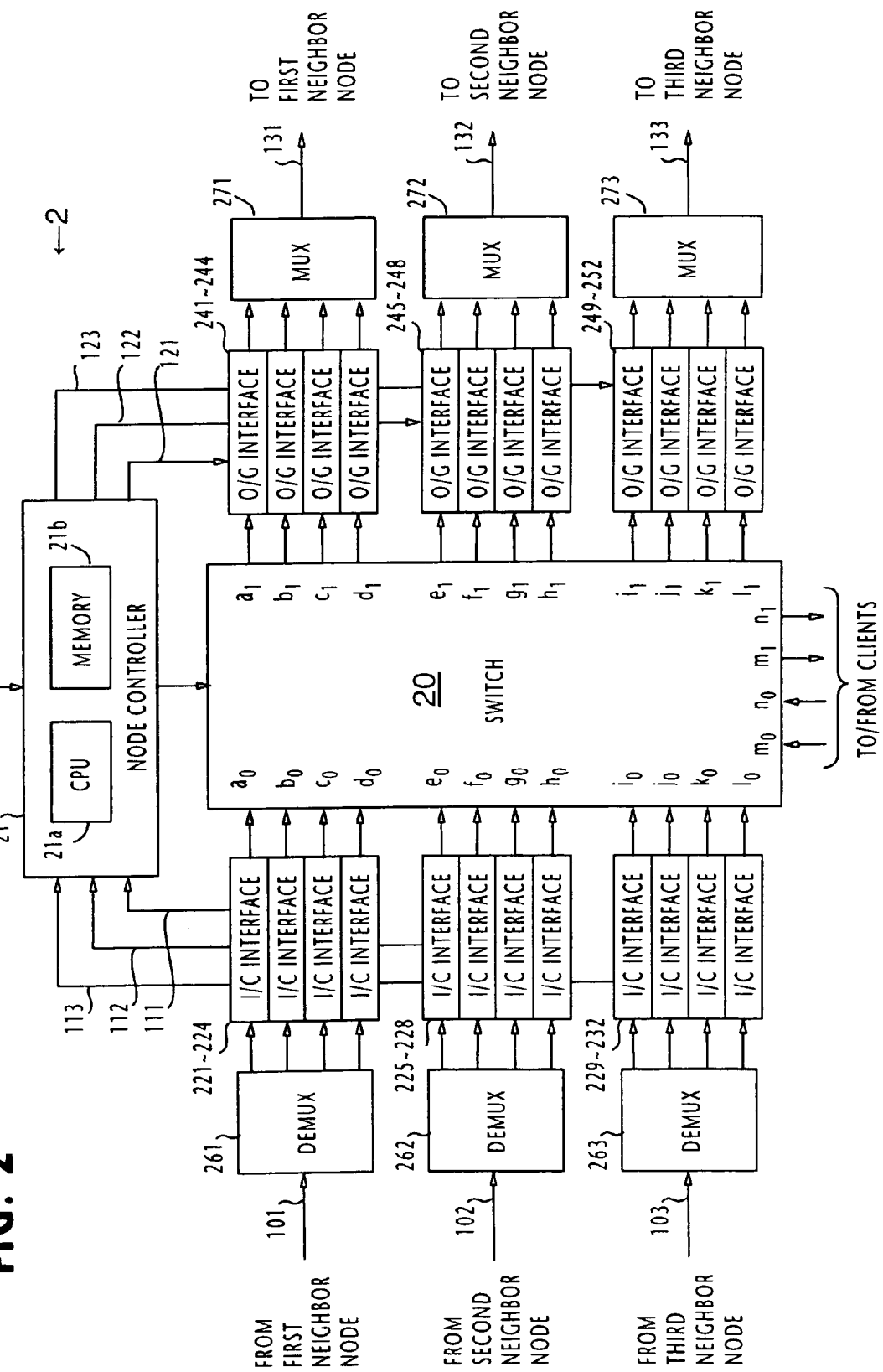
FIG. 2 is a block diagram of a network node of FIG. 1.

Details of each node of the network are illustrated in FIG. 2. As illustrated, each node as indicated by numeral 2 is comprised of a node controller 21 and a switch 20 controlled by the node controller. The node 2 is connected to other nodes by optical fibers 101 to 103, 131 to 133, each carrying a 4-channel WDM (wavelength division multiplex) signal. Each wavelength channel is a SONET (Synchronous Optical NETwork) signal of OC-192 (Optical Carrier level 192).

In other words, one optical fiber is equivalent to a single-direction link which carries an STS-768 (Synchronous Transport Signal) signal. Switch 20 is an electrical space switch for switching an electrical signal on a per wavelength basis between input ports $a_0 \sim l_0$ to and output ports $a_1 \sim l_1$. Switch 20 may be further connected client nodes (not shown) through input ports $m_0$, $n_0$ and output ports $m_1$, $n_1$. Switch 20 establishes a connection between an input port and an output port or between a single input port and two output ports.

The WDM signals transmitted from an adjacent node by optical fibers 101, 102, 103 are each demultiplexed by wavelength demultiplexers 261, 262, 263, and are converted to electrical signals by incoming line interfaces (IF) 221 to 232, and supplied to the input ports $a_0$ to $l_0$ of switch 20. Electrical signals that appear at the output port $a_1$ to $l_1$ of switch 20 are converted to optical signals by outgoing line interface (IF) 241 to 252 and multiplexed by wavelength multiplexers 271, 272, 273 and transmitted over optical fibers 131, 132 and 133.

Node controller 21 includes a CPU 21a and a memory 21b. Node controller 21 is connected to the incoming line interfaces 221~232 via control channel 111, 121, 113 and connected to the outgoing line interfaces 241~252 via control channel 121, 122, 123. Control channels 111 and 121, for example, are connected to data communication channels (DCC) of the SONET overhead so that the node controller 21 can communicate with the node controller 21 of a first adjacent node via optical fibers 101 and 131.

In like manner, the node controller 21 can communicate with a second adjacent node through control channels 112 and 122, and communicate with the node controller 21 of a third adjacent node through control channels 113 and 123. In addition, the node controller 21 can communicate with the network controller 1 through control a channel 100. In the memory 21b, a port table, a path table, and a link table of the node are defined.

The port table of node A, for example, is shown in FIG. 3. Port table has a plurality of entries corresponding to all input and output ports of the switch 20. Each entry is divided into fields for identifying the port with a port ID, the type of port (either input or output), an adjacent node, a corresponding port of adjacent node, a status of the port, a path identifier if the port is used by a path, and the recovery type of the path. The port ID is an identifier that locally uniquely identifies a port within the node A. The status of a port indicates whether the port is idle, busy or faulty. In the initial state, ports are labeled as "idle". Note that the shared recovery type protection path 312 is not indicated in the port table because no label (port) is assigned the time of initial setting.

The path table of node A is shown in FIG. 4. The path table is divided into a plurality of entries corresponding to all working and protection paths of the node A. Each entry is subdivided into fields for identifying the path with a tunnel ID (indicating a working-protection pair), a path ID, a bandwidth transported by the path, an upstream node ID, an upstream label, a downstream node ID, a downstream label, a recovery type of the path and a status of the path (either working or protection). Tunnel ID is an identifier that is globally unique in the network to identify a pair of working and protection paths. If a working path is not backed up by a protection path, a tunnel ID is assigned only to that working path. Path ID is an identifier which is also globally unique in the network to identify a path. A label is an identifier that is used in a node to identify a path among a number of links used by that node. In the illustrated example, the port ID is used as a label. The upstream node ID of the initiation node and the downstream node ID of the termination node are a client ID. One of the four recovery types (1+1, 1:1, shared, extra traffic) is indicated in the recovery type field of each path entry. At the time of initial setting, no label (port number) is assigned to a protection path of either shared or 1:1 recovery type.

In the specification, an unreserved bandwidth (URBW) of a link is defined as follows:

$$URBW = MXBW - ABW - RBW \quad (1)$$

where, MXBW=maximum bandwidth of the link,
ABW=assigned bandwidth,
RBW=reserved bandwidth.

Since an unassigned bandwidth (UABW) of a link is given by:

$$UABW = MXBW - ABW \quad (2)$$

the URBW of a link is rewritten as follows:

$$URBW = UABW - RBW \quad (3)$$

The present invention is characterized in that the URBW value of a link is associated with shared risk link groups. Hence the SRLG-associated unreserved bandwidth of a link is defined as URBW (i), where i represents the associated SRLG. The unreserved bandwidth (URBW (i)) of a link thus assumes a plurality of bandwidth values corresponding in number to the number of associated shared risk link groups.

Consider the link AD, for example, which accommodates the protection path 312. Since its working path 302 is established over the links AB and BF that belong to shared risk link groups G1 and G6, respectively, the URBW (i) of link AD is given by two bandwidth values, i.e. URBW (G1) and URBW (G6).

The link table of node A is shown in FIG. 5. The link table is divided into a plurality of entries corresponding to all unidirectional links that emanate from node A, i.e., links AB, AC and AD identified respectively by a link ID. The entry for each unidirectional link is subdivided into fields for indicating its attributes including a neighbor node ID, a link's maximum bandwidth (MXBW), an SRLG ID to which the link belongs, an SRLG-associated unreserved bandwidth (URBW (i)), an unassigned bandwidth (UABW) of a link, an assigned shared-recovery type protection bandwidth (ASPBW) and an extra-traffic bandwidth (ET/BW).

As will be described later, if a requested path is a shared-type protection path, and links through which its corresponding working path is established belong to some shared risk link groups, these groups are enumerated in a list of SRL groups and appended to a reservation request message which will be sent for setting up the requested path. For a given shared type protection path, URBW (i) values are calculated for a list SRL groups by subtracting the bandwidth of its corresponding working path from the initially set maximum bandwidth of the link. Thus, for protection path 312, URBW (i) are calculated for SRL groups G1 and G6 since the links AB and BF of its corresponding working path 302 belong to these SRL groups. In the URBW (i) field of a link such as AD where the shared protection path 312 is established, the initially set maximum bandwidth of the link (STS-768) remains unchanged for SRL groups other than those enumerated in the SRLG list of the shared-type protection path and is maintained as Max (URBW (i)) as a maximum available bandwidth for setting up possible protection paths.

If a requested path is a working path or a protection path of 1+1 or 1:1 type, the requested path is associated with all shared risk link groups of the network. In this case, URBW (i) values are calculated for all SRL groups of the network by subtracting the bandwidth of the requested path from the initially set maximum bandwidth of the link. Thus, for working path 302, URBW (i) values are calculated for all SRL groups of the network by subtracting its bandwidth STS-192 from the initial STS-768 maximum value, thus giving URBW (i) values, where i=G1, G2, . . . , G7, which are all equal to STS-576. This value is set in the URBW (i) field of the link AB as a maximum available bandwidth (i.e., Max (URBW (i)) for possible protection paths. Since no paths are established on the link AC, the initially set value of STS-768 is maintained in the URBW (i) field of this link.

If URBW (i) values are smaller than their Max (URBW (i), these URBW (i) values are set in the URBW (i) field of the link table respectively for the associated SRL groups. If a number of maximum URBW values are generated for different SRL groups, they are bundled together under the Max (URBW (i) and set in the URBW (i) field of the link table. Advantageously, this saves memory space.

Further defined in the specification is Min (URBW (i)) which is a net value of unreserved bandwidth of a link that can be used for any path and is given as:

Min ($URBW(i)$)=maximum bandwidth of a link−all reserved bandwidths except the bandwidth of extra traffic (ET/BW)  (4)

Further, an unassigned bandwidth of a link for extra traffic (ET/UABW) is defined as follows:

$ET/UABW=UABW$−Min ($URBW(i)$)−$ET/BW$  (5)

Equation (5) indicates that the unassigned bandwidth of a link for extra traffic is greater than the bandwidth of a path established through that link. In response to the link state advertisement message, each downstream node performs a route calculation by using links on each of which the unassigned bandwidth indicated in the link state advertisement message is greater than the bandwidth of a working path established on each of the links.

The node controller 21 of each node uses a routing protocol such as OSPF-TE, for example, (Open Shortest Path First Traffic Engineering Extension) for broadcasting link state advertisement (LSA) messages through the control channels 111~113 and 121~123 to the network. The broadcast message includes the node identifiers of initiation and termination nodes, metrics (i.e., number of hops which is set to 1 in this example), SRLG IDs, Min (URBW (i)), an ET unassigned bandwidth (ET/UABW), and unassigned bandwidths (UABW).

The advertised LSA message is used in each node to create a topology database in the memory 21b similar to the path and link tables described above. Before proceeding with a path reservation procedure, the node controller 21 of the initiation node of a path performs a path initialization process to calculate a path to the termination node of the path by using a route calculation algorithm such as CSPF (Constrained Shortest Path First). In this process, the links that cannot be used for setting up a path are identified as "unusable" in the topology database in order that they are not taken into the route calculation.

Since the unassigned bandwidth of extra traffic (ET/UABW) advertised by LSA messages is greater than the bandwidth of a path established through that link, there is no possibility that calculated routes for extra traffic do not pass through links where 1:1 or shared type protection paths are not established, nor through links where all bandwidth for such protection paths has been assigned.

Figure 6:
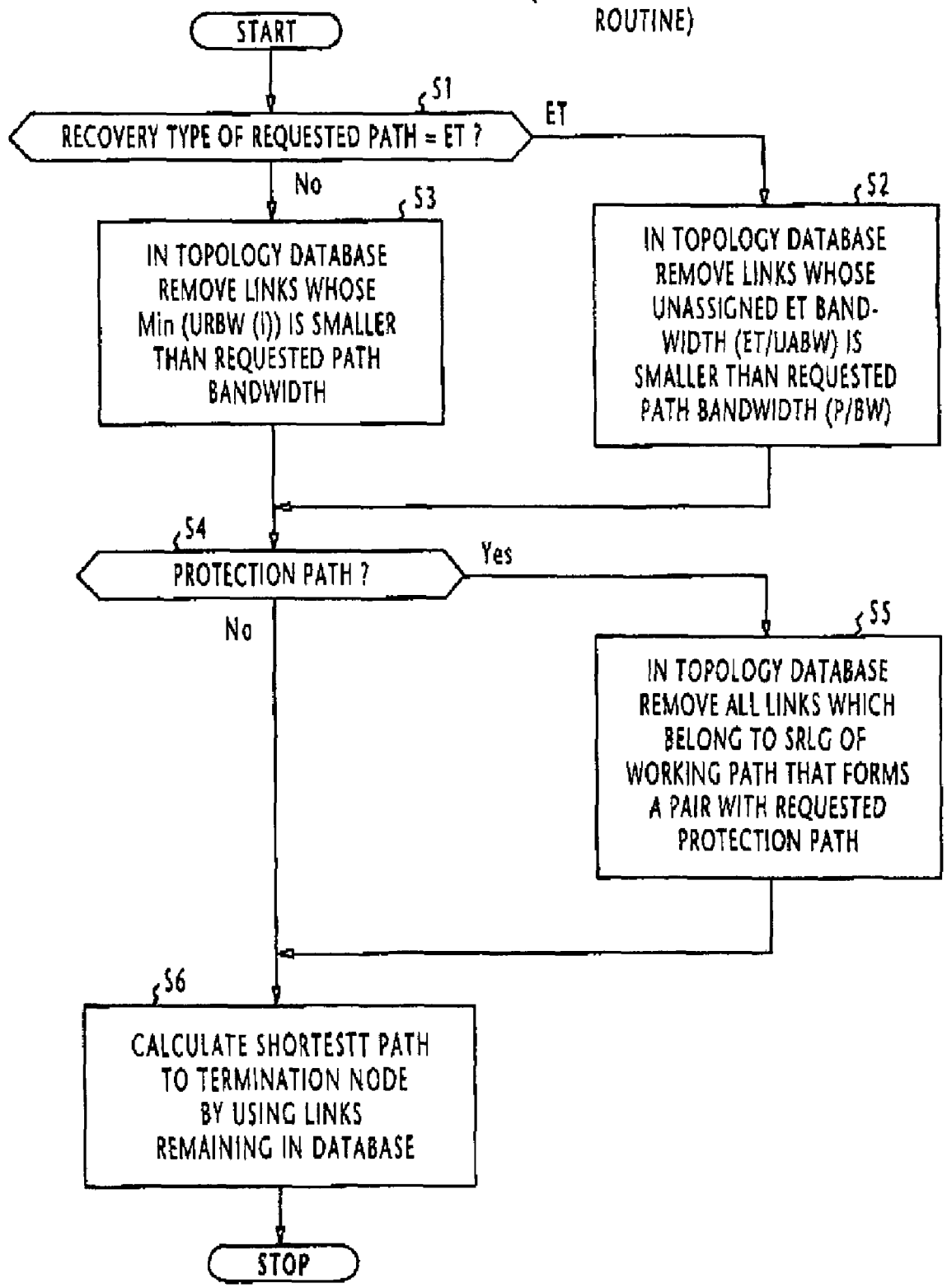
FIG. 6 is a flowchart of the operation of the node controller when a route calculation is provided.

FIG. 6 illustrates a route calculation algorithm performed by the node controller 21 for each of requested paths. If the fault recovery type of a path is indicated as "extra traffic" in the topology database (step S1), flow proceeds to step S2 to compare the ET/UABW (unassigned bandwidth of extra traffic) of a link that comprises the requested path with the bandwidth of the path. If the ET/UABW of a link is smaller than the path bandwidth, the link is removed from the topology database. As a result, those links whose ET/UABW are equal to or greater than the path bandwidth remain in the database.

If the fault recovery type of the requested path is other than the extra-traffic, flow proceeds from step S1 to S3 to compare the Min (URBW (i)) of all links of the database with the bandwidth of the requested path. If the Min (URBW (i)) of a link is smaller than the path bandwidth, the link is removed from the topology database. In this manner, those links whose Min (URBW (i)) is equal to or greater than the path bandwidth remain in the database.

At step S4, the node controller 21 determines whether or not the requested path is a protection path. If the requested path is a working path, flow proceeds to step S6. If the requested path is a protection path, flow proceeds to step S5 to delete all links of the database that belong to the SRLG (shared risk link group) of a working path that forms a pair with the requested protection path. With this removal, candidate links are constrained so that the protection path forms an SRL group which is disjoint with its working path.

At step S6, the node controller 21 of the initiation node calculates a shortest path to the path termination node based on a route calculation algorithm such as the well known Dijkstra algorithm by using all usable links of the topology database. This path calculation results in a set of concatenated links that comprise the requested path.

Following a path calculation process, the node controller 21 begins a signaling process for transmitting a signaling message over the calculated path to request the establishment of a path. The request may be rejected if a predetermined set of thresholds is not satisfied.

If both working and protection paths are requested, a signaling process is performed individually for each of the paths. Protocols such as RSVP-TE (Resource Reservation Protocol Traffic Engineering Extension) or CR-LDP (Constraint-based Routing Label Distribution Protocol) can be used for signaling. In the following description, the RSVP-TE protocol is used.

For establishing a path, the initiation node sends a reservation request message over the calculated path to the termination node of the path. The reservation request message contains the bandwidth of the path and identifiers including its tunnel ID, path ID, fault recovery type, and a path type indication for indicating whether the path is a working path or a protection path. In the case of a protection path, the reservation request message further contains an SRLG list of a working path to which the protection path forms a pair. The SRLG list is a set of ID's of shared risk link groups to which the links of the paired working path belong.

The following is a description of the operation of the node controller 21 of the initiation node, the intermediate node and the termination node when a reservation request message is transmitted from the initiation node toward the termination node.

Figure 7A:
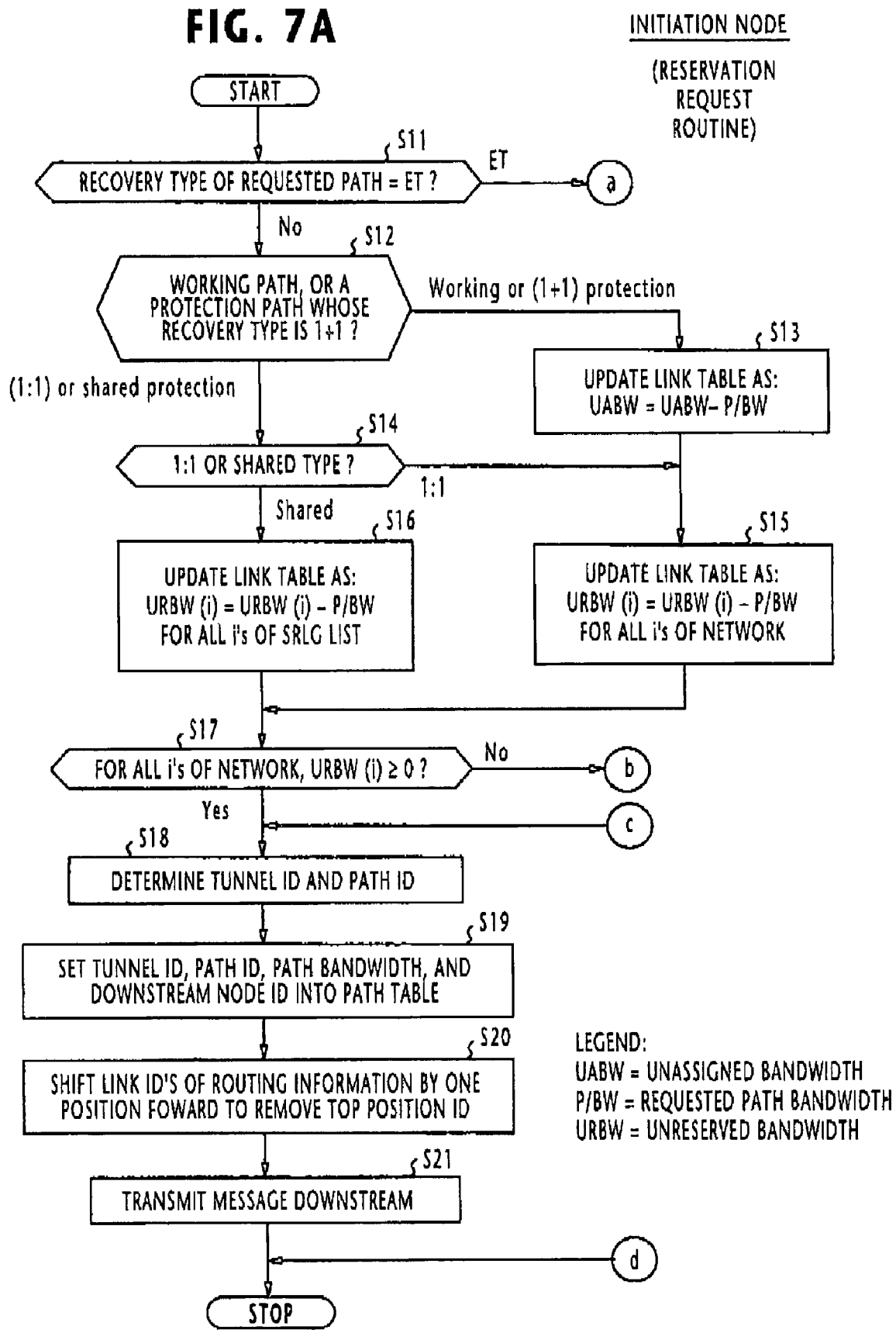
FIGS. 7A and 7B are a flowchart of the operation of the node controller when the node is an initiation node formulating and transmitting a reservation request message toward a termination node via at least one intermediate node.
Figure 7B:
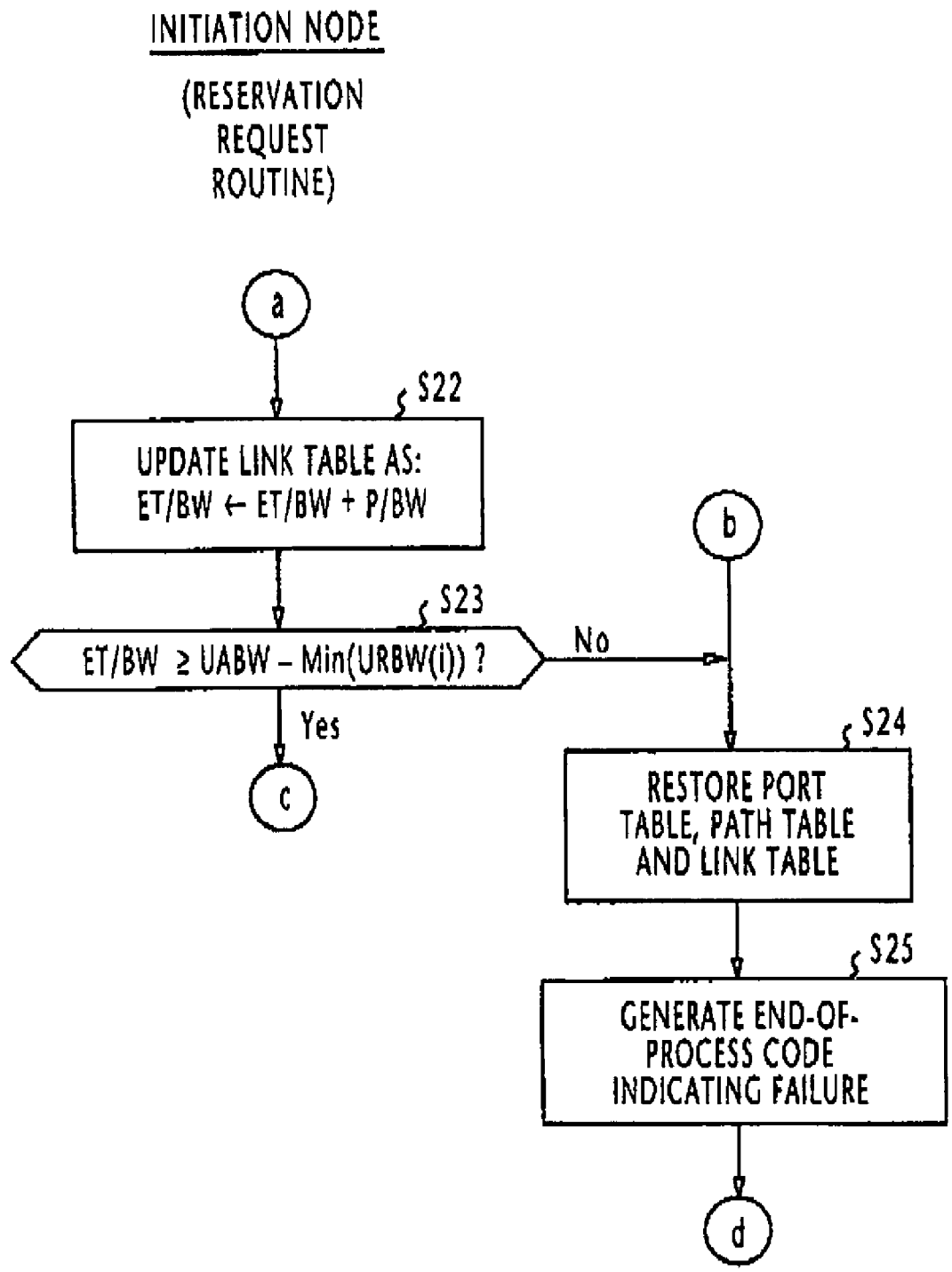

According to a first embodiment of the present invention, the node controller of the initiation node operates according to the flowchart of FIGS. 7A and 7B by using the route information obtained by the route calculation prepared by the routine of FIG. 8 and the tables of FIGS. 3, 5 and 6.

Before starting the routine, the node controller initializes the link table by setting the maximum value (STS-768) of the bandwidth of a downstream link into the maximum bandwidth field and the URBW (i) field of this link entry and setting the values of STS-768, 0 and 0 into the UABW, ASPBW and ET/BW fields, respectively, as initial values (FIG. 5).

At step S11 (FIG. 7A), the node controller makes a search through the link table for a link ID that occurs first on a requested path. Links detected in this way are downstream links as viewed from the initiation node along the requested path, The node controller detects a downstream link in the link table that is positioned at the top of the route information calculated by the routine of FIG. 8. The initiation node checks to see if the fault recovery type of the requested path is extra traffic, i.e., an ET path which will be set up on a shared or 1:1 type protection path.

If this is the case, flow proceeds to step S22 (FIG. 7B) to update the link table by summing the bandwidth of the requested path (P/BW) to the ET/BW of the detected downstream link and setting the sum in the ET/BW field of the detected downstream link. Therefore, in the ET/BW field of the entry of link AD (FIG. 5), the path bandwidth of STS-192 is summed to the initially set value of zero, so that this field is updated to STS-192.

At decision step S23, the node controller checks to see if the updated ET/BW value is equal to or greater than a difference between UABW (unassigned bandwidth) and Min (URBW (i)) for all SRL groups (i) of the network, i.e., the minimum value of unreserved bandwidth values for all SRL groups. If ET/BW is smaller than the difference value, the requested path cannot be established and flow proceeds to step 524 to restore the port table, path table and link table to the original values and reject the reservation request by generating an end-of-process code indicating that a reservation has failed (step S25), and flow proceeds to the end of the routine. If the updated ET/BW is equal to or greater than the difference value, the requested path can be established and flow proceeds from step S23 to step S18.

If the recovery type of the requested path is other than extra traffic, flow proceeds from step S11 to step S12 to determine if the requested path is a working path or a protection path of the "1+1" recovery type. If this is the case, flow proceeds to step S13 to calculate a difference by subtracting the path bandwidth from the UABW value of the downstream link and updates the link table by setting the calculated difference value into the UABW field of the downstream link. Therefore, the bandwidth of STS-192 of working path 302 is subtracted from the link's maximum value of STS-768 initially set in the UABW field of the entry of link AB and updated with a subtracted value of STS-576 as a maximum bandwidth available for possible protection paths (FIG. 5).

Note that since no working path nor protection path is assumed to be established on the unidirectional link AC, the URBW (i) field of the AC link entry maintains the same value as that initially set with the maximum bandwidth (=STS-768) of the link.

If the requested path is a protection path of 1:1 or shared type, flow proceeds from step S12 to decision step S14 to determine if the recovery type is "1:1". If this is the case, flow proceeds to step S15.

At step S15, the node controller calculates differences by subtracting the path bandwidth from the URBW (i) for all SRL groups (i) of the network and updates the link table by setting the URBW (i) field of the downstream link with the calculated difference values, and flow proceeds to decision step S17. Therefore, at step S15, the requested path (working path or a protection path of 1+1 or 1:1 type) is associated with all shared risk link groups of the network, and URBW (i) values are calculated for all SRL groups of the network by subtracting the bandwidth of the requested path from the initially set maximum bandwidth of the link. Thus, for working path 302, URBW (i) values are calculated for all SRL groups of the network by subtracting its bandwidth STS-192 from STS-768, giving URBW (i) values, where i=G1, G2, ..., G7, which are all equal to STS-576. These values are bundled together and set in the URBW (i) field of the link AB as Max (URBW (i)).

If the requested path is a protection path of "shared" recovery type, flow proceeds from step S14 to step S16 to calculate a set of difference values by subtracting the path bandwidth (P/BW) from the initial maximum bandwidth of the link to obtain URBW (i) values for all "i" of the SRLC list and updates the link table by setting the URBW (i) field of the downstream link with the calculated difference values. More specifically, if the requested path is a protection path 312, URBW (i) values are calculated for SRL groups G1 and G6. In the URBW (i) field of the link AD entry, the initial STS-768 value remains unchanged for other SRL groups of the network as Max (URBW (i)).

At decision step S17, the node controller checks to see if URBW (i) is equal to or greater than zero for all SRL groups (i). If at least one of the URBW values is smaller than zero, flow proceeds to step S24 to reject the reservation request, Otherwise, flow proceeds to step S18.

At step S18, the node controller 21 reserves a path by determining a tunnel ID and a path ID. If the requested path is a working path, a new tunnel ID and a new path ID are assigned to the path. In the case of a protection path, the tunnel ID of the corresponding working path and a new path ID are assigned.

At step S19, the node controller sets the tunnel ID, the path ID, and the bandwidth of the requested path. Additionally, the node controller 21 searches the neighbor node ID field of link table for a neighbor node of the downstream link and sets the detected neighbor node ID in the downstream node ID field of the path table.

At step S20, the node controller shifts all link ID's of the routing information one position forward so that the link ID at the top of the routing information is removed and the second link ID is placed in the top position of the list of downstream link ID's.

At step S21, the node controller 21 formulates a reservation request message for requesting the reservation of a path with the tunnel ID, the path ID, the bandwidth of the path, the fault recovery type of the path and an indication as to whether the path is a working path or a protection path, as well as the routing information in which downstream links of the requested path are indicated. In addition, the, and transmits the message downstream and terminates the routine. In this case, the node controller produces an end-of-process code indicating that a reservation request routine is successful at the initiation node.

Figure 8A:
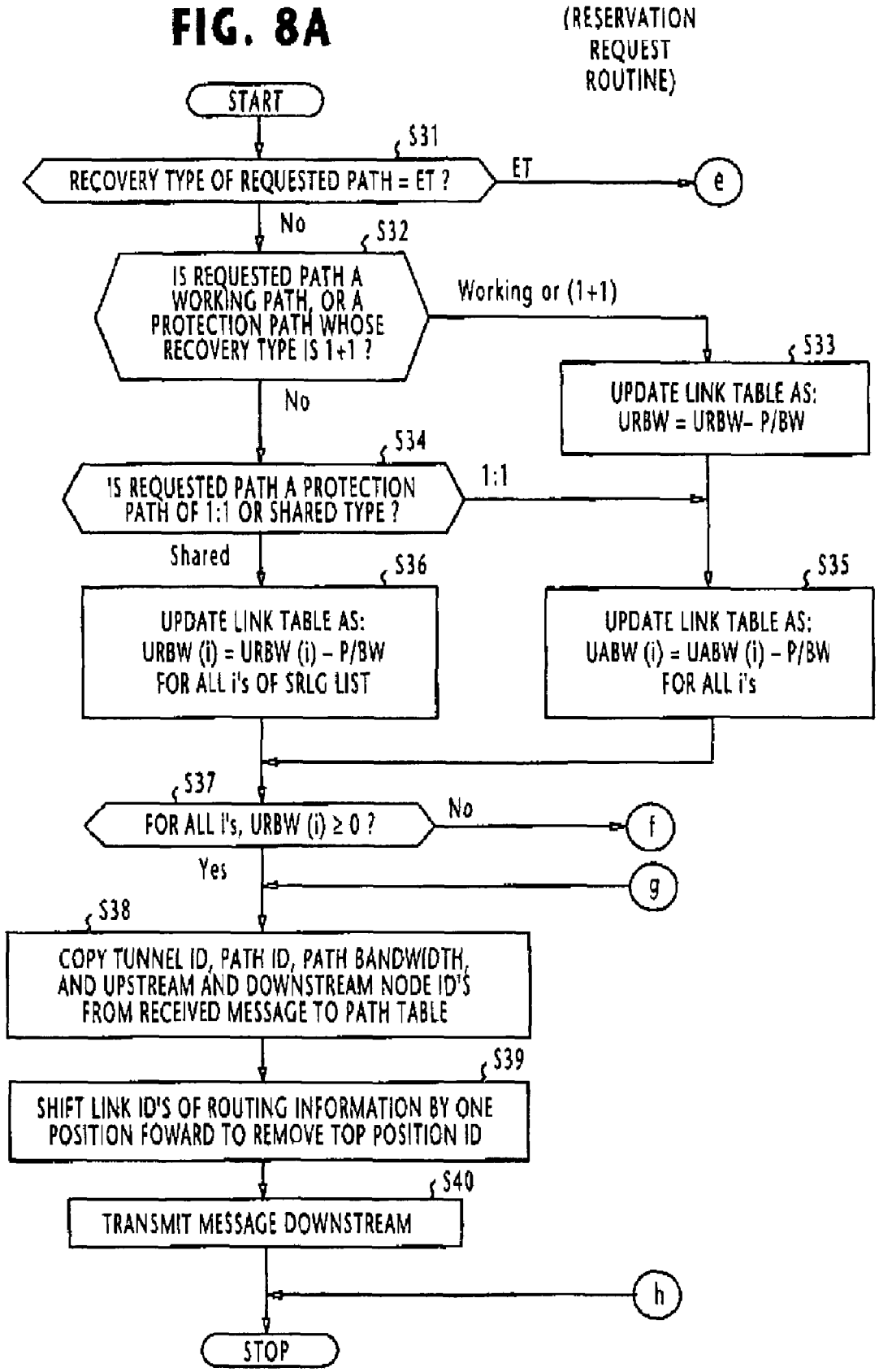
FIGS. 8A and 8B are a flowchart of the operation of the node controller when the node is an intermediate node retransmitting a reservation request message received from an upstream node toward the termination node.
Figure 8B:
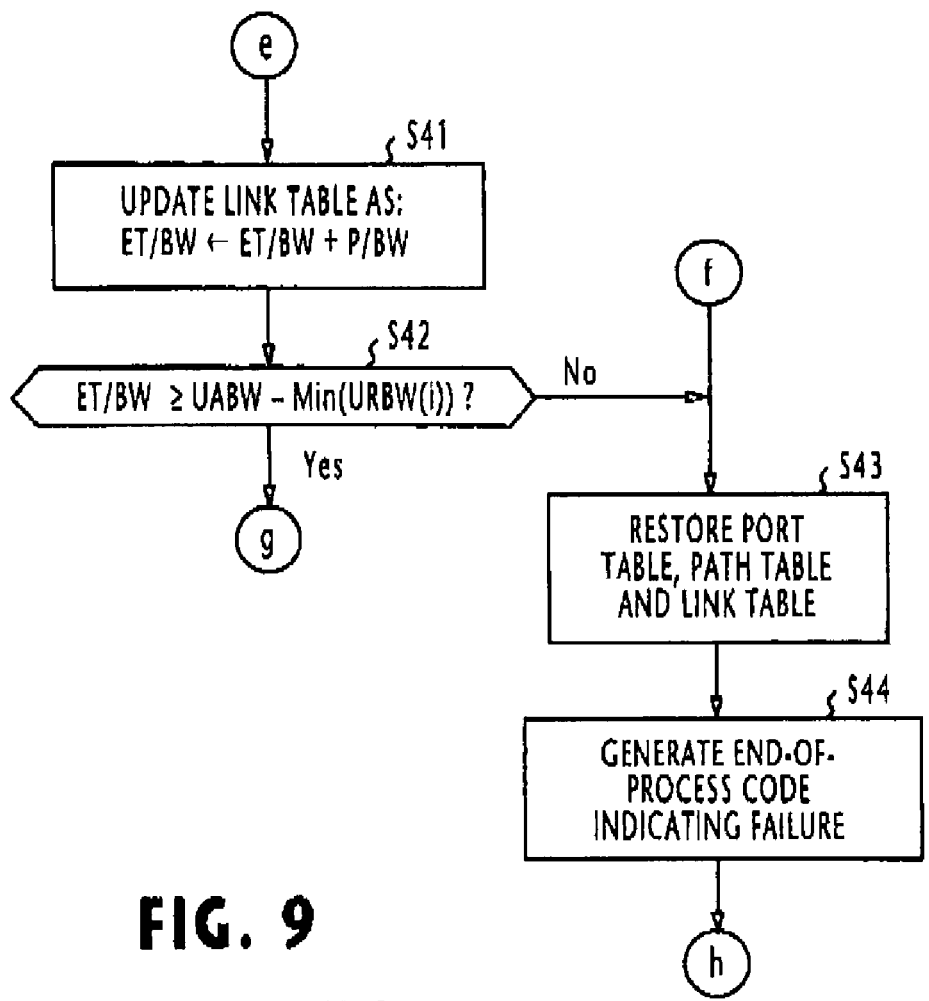

Following the execution of the routine of FIGS. 7A, 7B, the routine shown in FIGS. 8A and 8B is performed by an intermediate node in response to a reservation request message from an upstream node. The routine of FIGS. 8A, 8B differs from the routine of FIGS. 7A, 7B in that it does not perform path reservation step, which was performed by the initiation node at step S18.

When the intermediate node receives a reservation request message from an upstream node, it recognizes that the node from which it has received the message as the upstream node of a link that forms the requested path and checks the received message and proceeds through steps S31 to S37 (FIG. 8A) corresponding to steps S11 to S17 and through steps S41 and S42 (FIG. 8B), corresponding to steps S22 and S23 (FIG. 7B). Node controller 21 of the intermediate node proceeds from decision step S37 to step S38 to copy the tunnel ID, path ID and the bandwidth of the requested path from the received reservation request message to the path table, and sets the upstream and downstream node identifiers in the path table. Corresponding to steps S20 and S21 of FIG. 7A, steps S39 and S40 are executed in the same manner as they are executed in the initiation node, so that the reservation request message is transmitted further downstream. If the decision at step S37 or S42 is negative, steps S43 and S44 are executed in the same manner as steps S24, S25 are executed in the initiation node to reject the reservation request.

Figure 9:
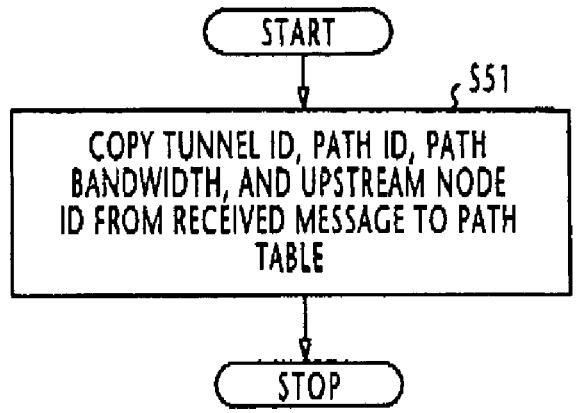
FIG. 9 is a flowchart of the operation of the node controller when the node is a termination node for receiving a reservation request message and for preparing the transmission of a reservation response message to the initiation node.

When the termination node of the requested path receives a reservation request message, the node controller 21 of the termination node detects an upstream node ID in the same way as the intermediate node has recognized the upstream node and copies the tunnel ID, path ID and path bandwidth from the reservation request message to its path table and sets the recognized upstream node ID in the path table (step S51 of FIG. 9). As in the intermediate node, the path reservation process is not performed in the termination node.

Figure 10A:
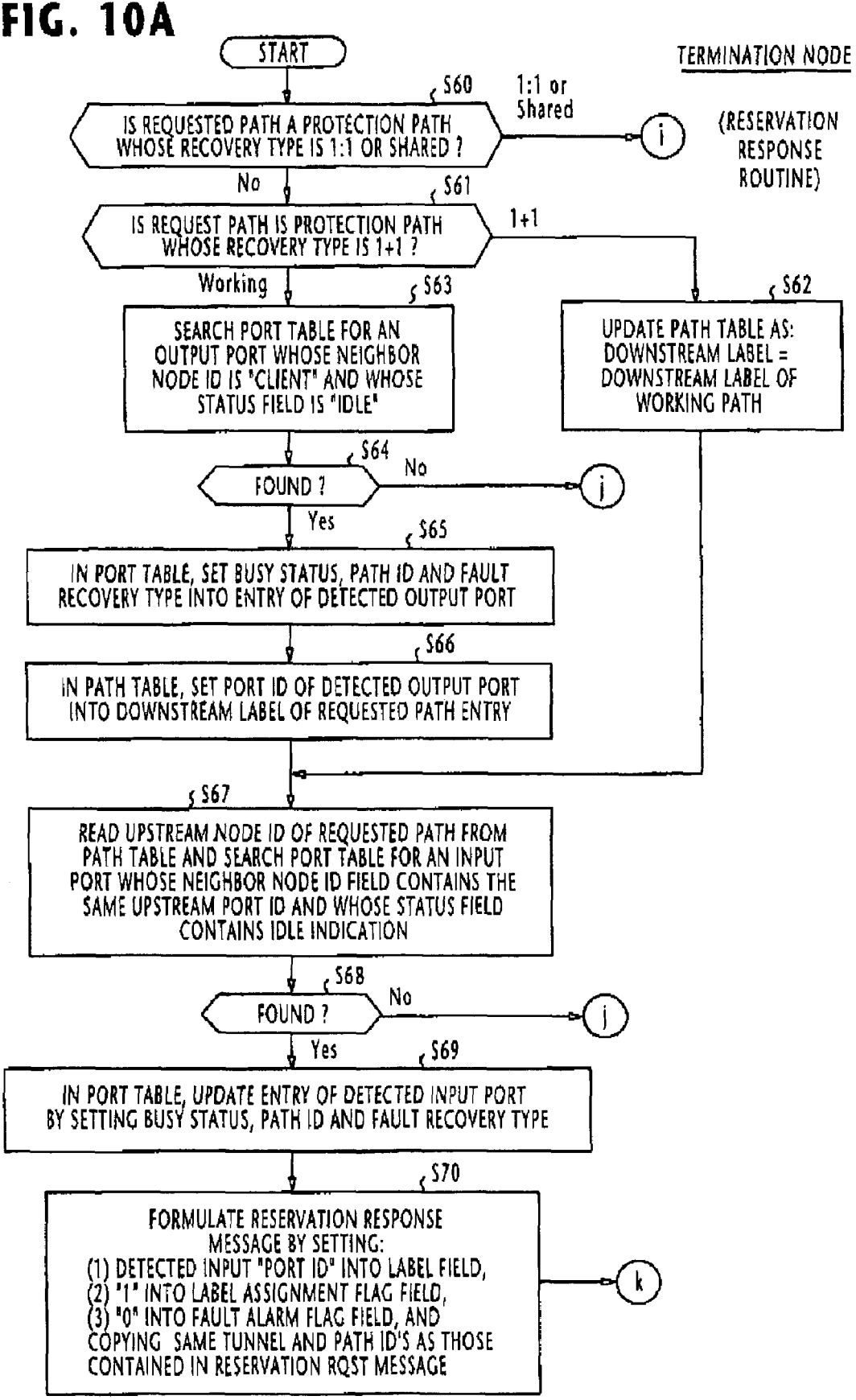
FIGS. 10A and 10B are a flowchart of the operation of the node controller of the termination node for formulating and transmitting a reservation response message toward the initiation node.
Figure 10B:
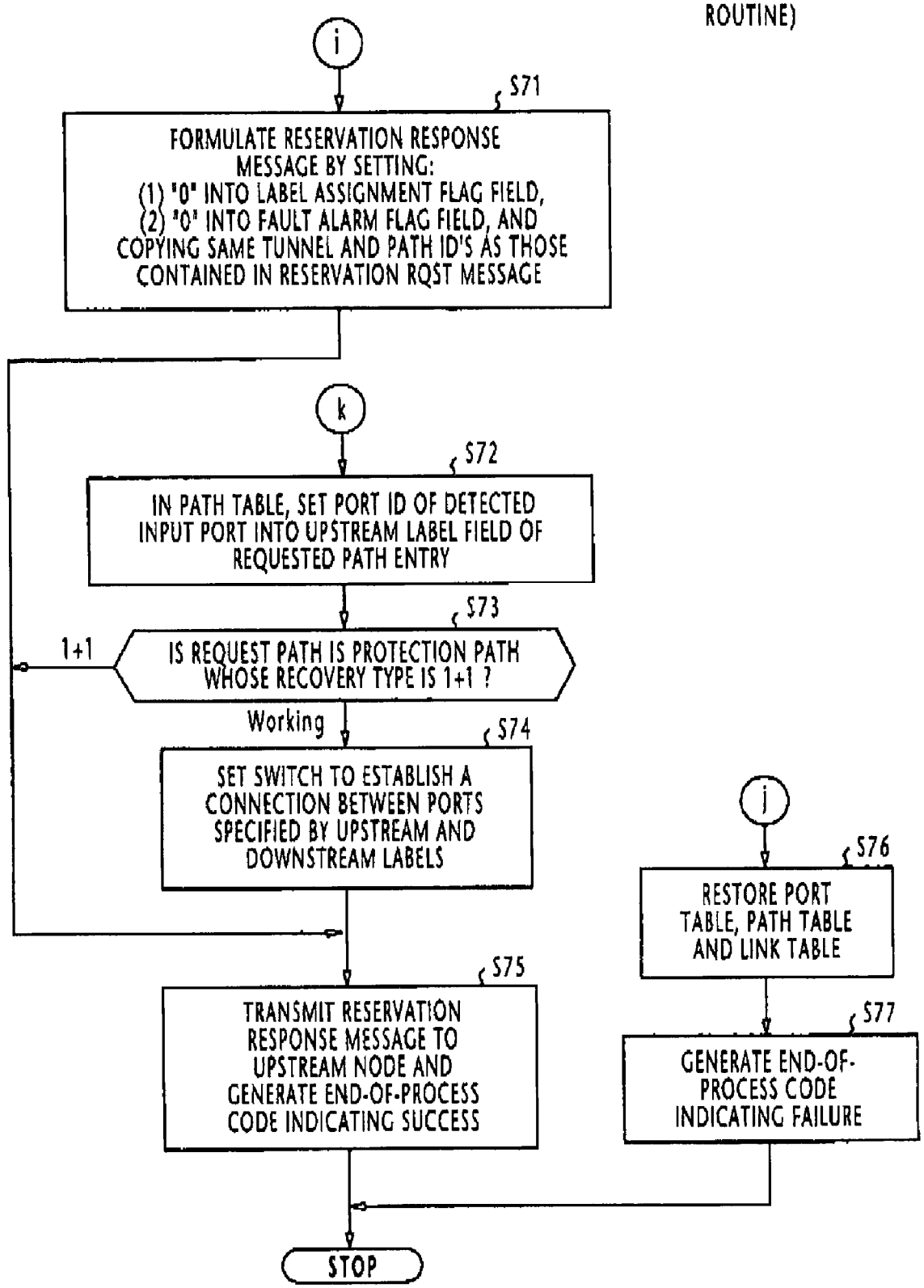

Following the execution of step S51, the termination node proceeds to perform the routine shown in FIGS. 10A and 10B to formulate and transmit a reservation response message to the upstream node from which it has received the reservation request message. The process of formulating a reservation response message is essentially a connection establishment process when a working path is requested and a label assignment process for assigning a label if a working path or a 1+1 recovery type protection path is requested. The reservation response message includes a tunnel ID, a path ID, a label and a fault recovery flag. Note that the tunnel ID and the path ID are of the same value as those contained in the reservation request message.

In FIG. 10A, the node controller 12 of the termination node examines the working/protection indication and fault recovery type fields of the received reservation request message (step S60). If the requested path is a protection path and its fault recovery type is "1:1" or shared, flow proceeds to step S71 (FIG. 10B) to formulate a reservation response message by setting "0" in the label assignment flag field of the message, "0" into the fault alarm flag field, and copying the same tunnel and path ID's as those contained in the received reservation request message. The message will then be transmitted upstream and an end-of-process code is generated for indicating that the routine has been successful (step S75).

If the decision at step S60 is negative, flow proceeds to step S61 to determine if the requested path is a protection path and its recovery type "1+1". If his is the case, flow proceeds to step S62 to assign the same downstream label as that assigned to the corresponding working path. This is achieved by setting the downstream label into the downstream label field of the path table, and flow proceeds to step S67.

If the requested path is a working path, the decision at step S61 is negative and flow proceeds to step S63 to make a search through the port table for an output port whose neighbor node ID is "client" and whose status field is set "idle". If such an output port is not detected, the decision at step S64 is negative and flow proceeds to step S76 to restore the port table, path table and link table to the original state and generate an end-of-process code for indicating that the routine has resulted in a failure (step S77) and the routine is terminated.

If an output port is detected, the decision at step S64 is affirmative and flow proceeds to step S65 to update the port table by setting a "busy" indication, the path ID and the fault recovery type into corresponding fields of the detected output port of the port table. At step S66, the node controller of termination node updates its path table by setting the port ID of the detected output port into the downstream label field of the entry identified by the path ID of the requested path.

At step S67, the node controller reads an upstream node ID of the requested path from the path table and uses it as a key to search the port table for an input port whose neighbor node ID field contains the same upstream port ID and whose status field contains an "idle" indication.

If such an input port is detected, the decision at step S68 is affirmative and flow proceeds to step S69. Otherwise, flow proceeds to step S76 (FIG. 10B) to reject the reservation request.

At step S69, the node controller updates the port table by changing the status field of the detected input port to "busy" and setting the path ID and fault recovery type into the entry of detected input port of the port table.

At step S70, the node controller formulates a reservation response message by setting the detected input port ID into the label field of the message, a "1" into the label assignment flag field of the message, a "0" into the fault alarm flag field, and by copying the same tunnel and path ID's as those contained in the reservation request message to the reservation response message. Flow proceeds from step S70 to step S72 (FIG. 12B) to update the path table by setting the port ID of the detected input port into the upstream label field of the requested path entry. At decision step S73, the node controller determines whether the requested path is a protection path and its fault recovery type is "1+1". If this is the case, flow proceeds to step S75 to transmit the reservation response message upstream. If the requested path is a working path, flow proceeds from step S73 to step S74 to set the switch to establish a connection between ports specified by the upstream and downstream labels, respectively, which is followed by the transmission of the reservation response message at step S75.

Figure 11B:
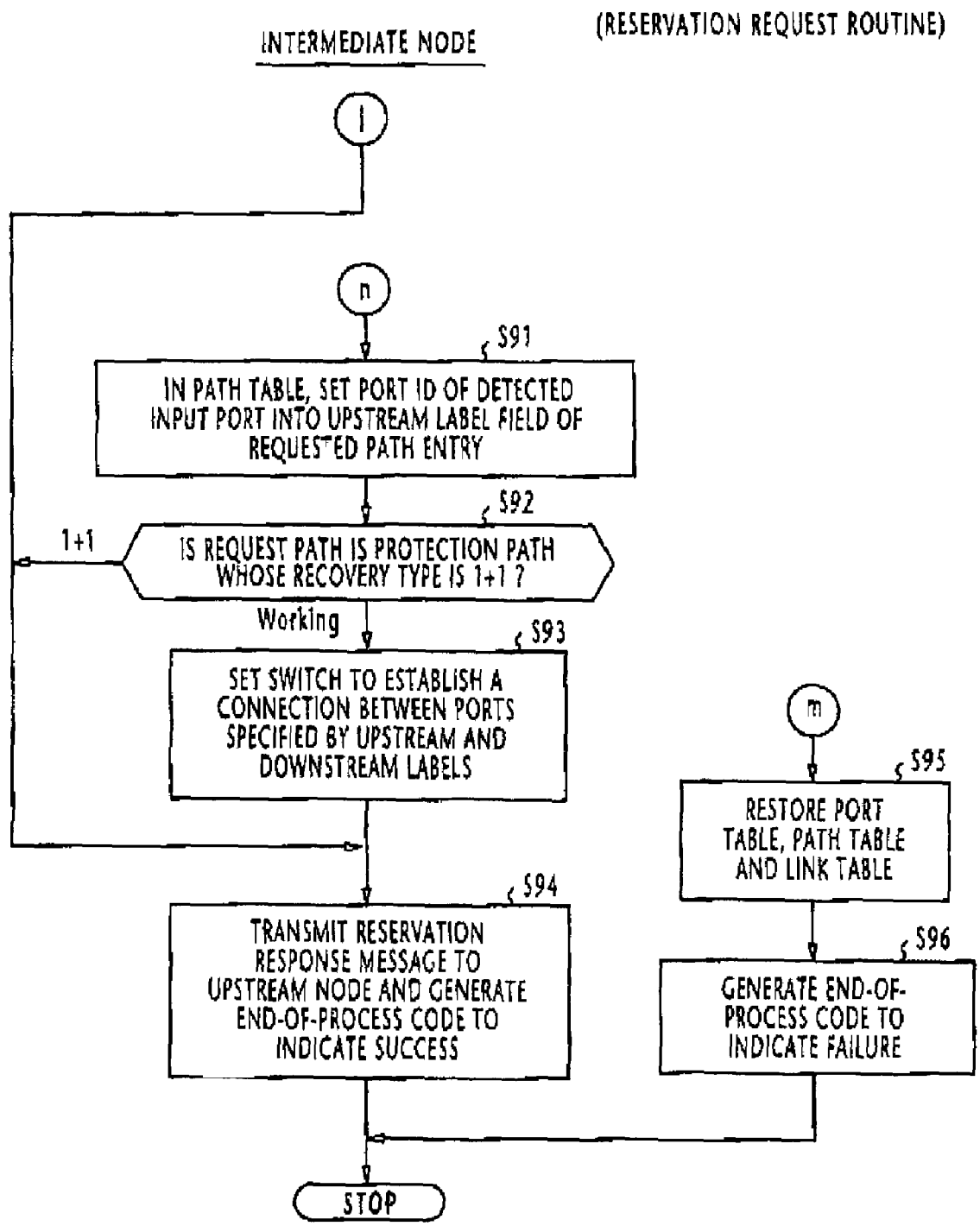

In FIG. 11A, the node controller 12 of an intermediate node receives the reservation response message from the termination node and examines the label assignment flag of the message (step S81). If the requested path is a protection path and its fault recovery type is "1:1" or shared, the flag is "0" indicating that no label has been assigned and flow proceeds to step S90 (FIG. 13B) to retransmit the received message upstream and an end-of-process code is generated for indicating that the routine has been successful (step S94). If the label assignment flag is "1", the decision at step S81 is affirmative and flow proceeds to step S82 to make a search through the port table for an output port whose neighbor node ID is a downstream node and whose remote port ID field is a "label". If such an output port is not detected, the decision at step S83 is negative and flow proceeds to step S95 to restore the port table, path table and link table to the original state and generate an end-of-process code for indicating that the routine has resulted in a failure (step S96) and the routine is terminated.

If an output port is detected, the decision at step S83 is affirmative and flow proceeds to step S84 to update the port table by setting a "busy" indication, the path ID and the fault recovery type into corresponding fields of the detected output port of the port table. At step S85, the node controller of the intermediate node updates its path table by setting the port ID of the detected output port into the downstream label field of the entry identified by the path ID of the requested path.

At step S86, the node controller reads an upstream node ID of the requested path from the path table and uses it as a key to search the port table for an input port whose neighbor node ID field contains the same upstream port ID and whose status field contains and "idle" indication.

If such an input port is detected, the decision at step S87 is affirmative and flow proceeds to step S88. Otherwise, flow proceeds to step S95 (FIG. 13B) to reject the reservation request.

At step S88, the node controller updates the port table by changing the status field of the detected input port to "busy" and setting the path ID and fault recovery type into the entry of detected input port of the port table.

At step S89, the node controller formulates a reservation response message by setting the detected input port ID into the label field of the message, a "1" into the label assignment flag field of the message, a "0" into the fault alarm flag field, and by copying the same tunnel and path ID's and label assignment flag as those contained in the reservation request message to the reservation response message. Flow proceeds from step S89 to step S91 (FIG. 11B) to update the path table by setting the port ID of the detected input port into the upstream label field of the requested path entry. At decision step S92, the node controller determines whether the requested path is a protection path and its fault recovery type is "1+1". If this is the case, flow proceeds to step S94 to transmit the reservation response message upstream. If the requested path is a working path, flow proceeds from step S92 to step S93 to set the switch to establish a connection between ports specified by the upstream and downstream labels, respectively, which is followed by the transmission of the reservation response message at step 594.

Figure 12A:
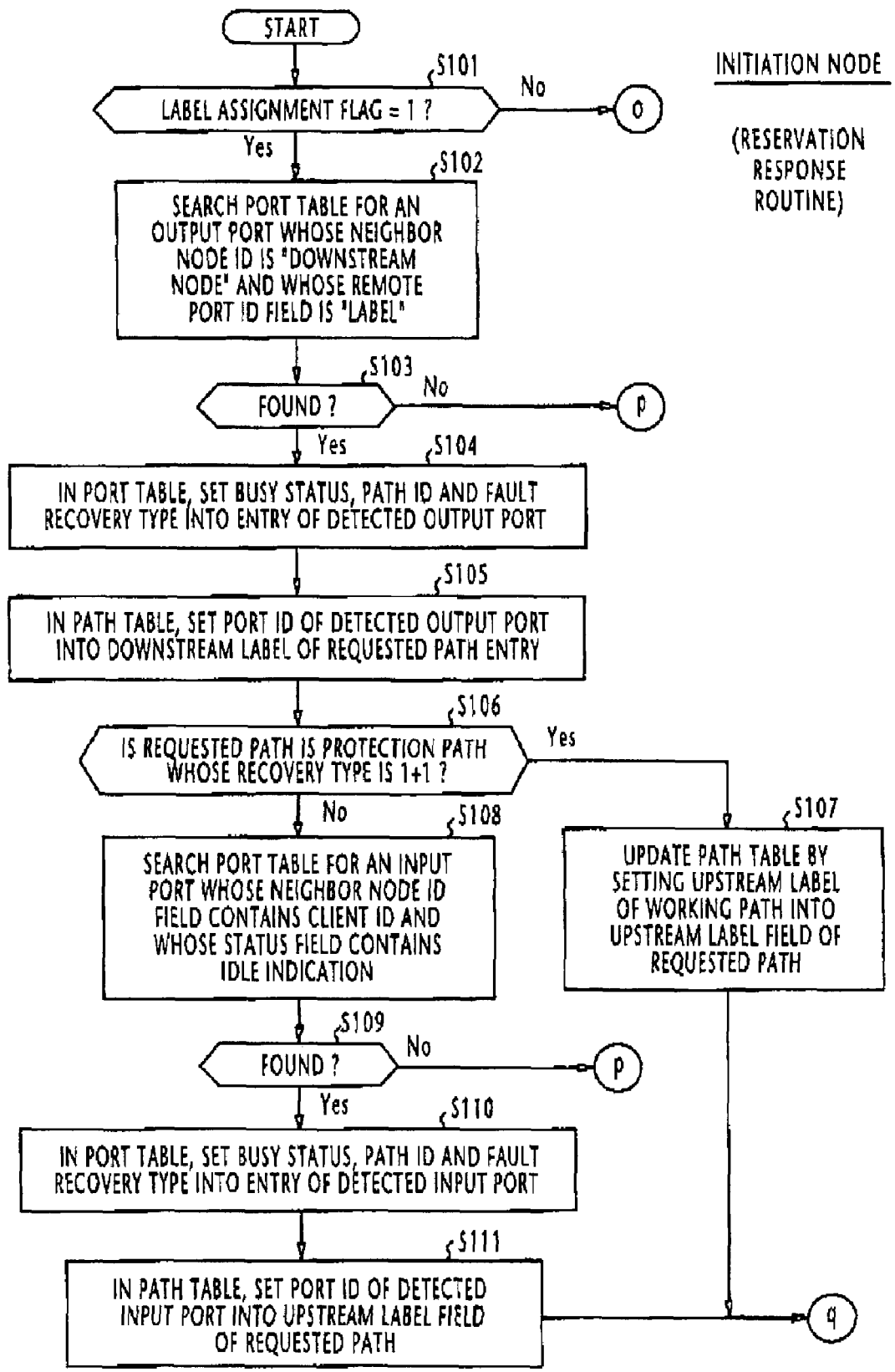

In FIG. 12A, the node controller 12 of the initiation node receives the reservation response message from the intermediate node and examines the label assignment flag of the message (step S101). If the requested path is a protection path and its fault recovery type is "1:1" or shared, the flag is "0" indicating that no label has been assigned. In this case, flow proceeds to step S113 (FIG. 12B) to generate an end-of-process code is generated for indicating that the routine has been successful.

If the label assignment flag is "1", the decision at step S101 is affirmative and flow proceeds to step S102 to make a search through the port table for an output port whose neighbor node ID is a downstream node and whose remote port ID field is a "label". If such an output port is not detected, the decision at step S103 is negative and flow proceeds to step S114 to restore the port table, path table and link table to the original state and generate an end-of-process code for indicating that the routine has resulted in a failure (step S115) and the routine is terminated.

If an output port is detected at step S103, flow proceeds to step S104 to update the port table by setting a "busy" indication, the path ID and the fault recovery type into corresponding fields of the detected output port of the port table. At step S105, the node controller of the initiation node updates its path table by setting the port ID of the detected output port into the downstream label field of the entry identified by the path ID of the requested path.

At decision step S105, the node controller checks to see if the requested path is a protection path whose recovery type is 1+1. If so, flow proceeds to step S107 to update the path table by setting the upstream label field of the requested path entry with the upstream label of a working path with which the protection path forms a pair. Flow proceeds to step S112 to establish a connection in the switch between input and output ports specified by the upstream and downstream labels. At step S113, an end-of-process code is generated to indicate a successful establishment of a path.

If the requested path is a working path, the decision at step 106 is negative and flow proceeds to step S108 to search through the port table for an input port whose neighbor node ID field contains a client ID and whose status field contains an idle indication. If the search fails, the decision at step S109 is negative and flow proceeds to step S114 to restore the port table, path table and link table to the original state and generate an end-of-process code to indicate that the path establishment has failed.

If the search is successful, the decision at step S109 is affirmative and flow proceeds to step S110 to update the port table by setting a busy status indication, the path ID and the fault recovery type of the path into the entry of the detected input port. At step S111, the node controller of the initiation node updates the path table is updated by setting the port ID of the detected input port into the upstream label field of the requested path and proceeds to step S112 to set up a connection in the switch.

In the above description, the end-of-process code of either success or failure indication may be transmitted to the network controller 1 for the purpose of network resource management. With the establishment of a path, the updated attributes of the associated links are advertised to the network by using link-state advertisement (LSA) messages.

If a failure occurs in a working path, the termination node of the path is alerted and initiates a fault recovery process.

During the fault recovery process, the operation of the node controller 21 at the termination node begins with decision step S121 of FIG. 13A by making a decision as to whether the recovery type of the failed working path is "1+1". If this is the case, flow proceeds to step S135 (FIG. 13B) to release the connection between the ports of the switch 20 specified by the entry of the failed working path of the path table and establish a connection between the ports specified by the entry of a protection path which is indicated by the same tunnel ID as that of the failed working path.

If the recovery type of the failed working path is "1:1", flow proceeds through steps S122 and S123 to step S126 to assign the same downstream label as that of the failed working path. At step S127, the node controller reads an upstream node ID of the requested path from the path table and uses it as a key to search the port table for an input port whose neighbor node ID field contains the same upstream port ID and whose status field contains an "idle" indication. If such an input port is detected, the decision at step S128 is affirmative and flow proceeds to step S129. Otherwise, flow proceeds to step S131 (FIG. 13B) to make a further search through the port table for an input port whose fault recovery type is "extra traffic". If such an input port is not detected, flow proceeds to step S137 to restore all the updated tables and generate an a failure indicating end-of-process code (step S138).

If the decision at step S132 is affirmative, flow proceeds to step 133 to update the port table by changing the status field of the detected input port to "idle" and changing the fault recovery type field to blank. In this manner, the label assigned to an ET bandwidth is released, and flow proceeds to step S127 (FIG. 13A) to perform a label finding search. Since the released label is available, the node controller detects an input port and proceeds from step S128 to step S129 to update the port table by changing the status field of the detected input port to "busy" and setting the path ID and fault recovery type into the entry of detected input port of the port table.

At step S130, the node controller formulates a fault recovery message by setting the detected input port ID into the label field of the message, a "1" into the label assignment flag field of the message, a "1" into the fault alarm flag field, and other routing information as those contained in the reservation response message. The fault recovery message is then transmitted to the intermediate node.

Flow proceeds from step S130 to step S134 (FIG. 13B) to update the path table by setting the port ID of the detected input port into the upstream label field of the protection path entry. Node controller 21 of the termination node establishes a connection in the switch between ports specified by the upstream and downstream labels of the updated path table (step S135) and an end-of-process code is generated (Step S136).

If the recovery type of the protection path is "shared", flow proceeds from step S122 to step S124 to update the link table by calculating a sum of the assigned path protection bandwidth (ASPBW) of the associated link and the bandwidth of the protection path (P/BW) and setting the sum into the ASPBW field of the associated link entry (FIG. 5). At decision step S125, the node controller checks to see if the updated ASPBW value is equal to or smaller than Max (URBW (i))–Min (URBW (i), where Max (URBW (i)) represents the maximum value of URBW (i) values for all SRL groups (i) of the network. If the decision is negative, flow proceeds to step S137 to restore the tables. Otherwise, flow proceeds to step S126 to perform label assignment, message transmission and connection establishment processes, in the same manner as mentioned above in connection with the 1:1 recovery type.

When the node controller 21 of intermediate node receives the fault recovery message from the termination node, it conducts a search through the port table at step S141 of FIG. 14A to detect an output port whose neighbor node ID field contains a downstream node ID and whose remote node ID field contains a label.

If such an output port is detected (step S142), flow proceeds to step S143 to update the detected port entry of the port table by setting busy indication in the status field and the fault recovery type of the protection path into the fault recovery field. Otherwise, table restoration and failure indication process is performed at steps S157 and S158 (FIG. 14B).

Flow proceeds from step S143 to step S144 to update the path table so that the detected output port ID is set into the downstream label field of the protection path entry.

At decision step S145, the node controller of the intermediate node determines whether the recovery type of the protection path is "shared". If so, it proceeds to step S146 to update the link table by calculating a sum of the assigned path protection bandwidth (ASPBW) of the associated link and the bandwidth of the protection path (P/BW) and setting the sum into the ASPBW field of the associated link entry in the same way as the termination node performed step 5124 of FIG. 13A. At decision step S147 which corresponds in significance to step S125, the node controller checks to see if the updated ASPBW value is equal to or smaller than Max (URBW (i))–Min (URBW (i). If the decision is negative, table restoration and failure indication process is performed at steps S157 and S158. If the decision is affirmative at step S147, flow proceeds to step S148 to read the upstream node ID of the requested protection path from the path table and makes a search through the port table for an input port whose neighbor node ID field contains the same upstream port ID and whose status field contains idle indication. If such an input port is detected (step S149, FIG. 14B), flow proceeds to step S150 to reformulate a fault recovery message by setting the detected input port ID into the label field of the message, a "1" in the label assignment flag field, and a "1" in the fault alarm field.

At step S151, the path table is updated by changing the upstream label field of the requested protection path entry to the detected input port ID. A connection is established in the switch between the ports identified by the upstream and downstream labels of the entry of the requested path (step S152) and the fault recovery message is transmitted to the initiation node and an end-of-process code is generated (step S153).

If no input port is detected (step S149), flow proceeds to step S154 to search the port table for an input port whose fault recovery type is "extra traffic". If such an input port is detected (step S155), flow proceeds to step S156 to update the port table by setting an idle indication in the status field of the detected input port entry and setting the fault recovery type of the requested path into the fault recovery type field. Flow proceeds from step S156 to step S148 to make a further search through the port table for an input port which will be found in the vacated input port entry.

If the recovery type of the protection path is other than "shared", the decision at step S145 is negative and flow skips steps S145 and S146 and to make a search through the port table for an available input port (step S148).

In the initiation node, the node controller 21 responds to the fault recovery message from the intermediate node by making a search through the port table at step S161 of FIG. 15. Similar to step S141 of the intermediate node, the node controller seeks an output port whose neighbor node ID field contains a downstream node ID and whose remote node ID field contains a label. If such an output port is detected (step S162), the detected port entry of the port table is updated by setting busy indication in the status field and the fault recovery type of the protection path is set into the fault recovery field (step S163). Otherwise, table restoration and failure indication process is performed at steps S167 and S168.

At step S164, the path table is updated so that the upstream label of the failed working path is set into the downstream label field of the protection path entry. A connection is established in the switch between the ports specified in the path table by the upstream and downstream labels of the entry of the protection path (step S165) and an end-of-process code is generated (S166).

The first embodiment of the present invention is summarized as follows:

When a working path fails, the network is recovered from failure if the recovery type of this path is "1+1", "1:1" or "shared" by switching traffic to a corresponding protection path. No recovery procedure is performed on a working path if it is of unprotected or extra traffic type. Thus, different recovery classes of communication channels (1+1, 1:1, shared, unprotected, extra-traffic) can be accommodated in a single network with a recovery policy of different priorities.

Although "1+1" protection paths are assigned a label and hence they are established in parallel with their corresponding working paths, they are not recovered from failure. Therefore, traffic on a working path can be recovered from failure in so far as both working and protection paths fail simultaneously. No label is assigned to 1:1- or shared-type protection paths. These protection pats are assigned a label when a fault recovery process is performed to establish connections through the network.

The 1:1- or shared-type protection paths can be distinguished from each other for separate management by the different amounts of reserved bandwidth as given by the following relations:

Bandwidth reserved for a 1:1-type protection path=$UABW$ (unassigned bandwidth)−Max ($URBW$ ($i$))

Bandwidth reserved for a shared-type protection path=Max($URBW$($i$))−Min($URBW$($i$))

When more than one working path should fail simultaneously (except one whose recovery type 1+1), the 1:1-type protection path is established with higher priority than the shared-type protection path, because the label assignment principle is such that, on each link of a protection path, a label is assigned only if ASPBW (assigned shared protection bandwidth) is equal to or smaller than the difference between Max (URBW ($i$)) and Min (URBW ($i$)), i.e., the bandwidth reserved for a shared-type protection path.

The communications network of the present invention can be modified so that the port tables, path tables and link tables of all nodes of the previous embodiment are concentrated in a network controller and created in the memory 12 of the network controller 1. As a result of this concentration, no routing protocol is used to broadcast link state advertisement messages. Network controller 1 integrates all link information of the network and organizes the integrated link information to create a topology database in the memory 12. In response to a path setup request from an initiation node, the network controller 1 provides a route calculation to the termination node in the same manner as described in the previous embodiment, and then performs an initial setting procedure on each of the nodes A to F by operating a virtual signaling protocol using their port, path and link tables in the same manner as described above. According to upstream and downstream labels set in the path tables of all node, the network controller sends control messages to all nodes to establish connections through the switches of all nodes. When a failure is detected on a working path, the termination node of the path informs the network controller of this fact. Network controller 1 operates according to the virtual signaling protocol, using the port, path and link tables of all nodes to reestablish connections.

Figure 16:
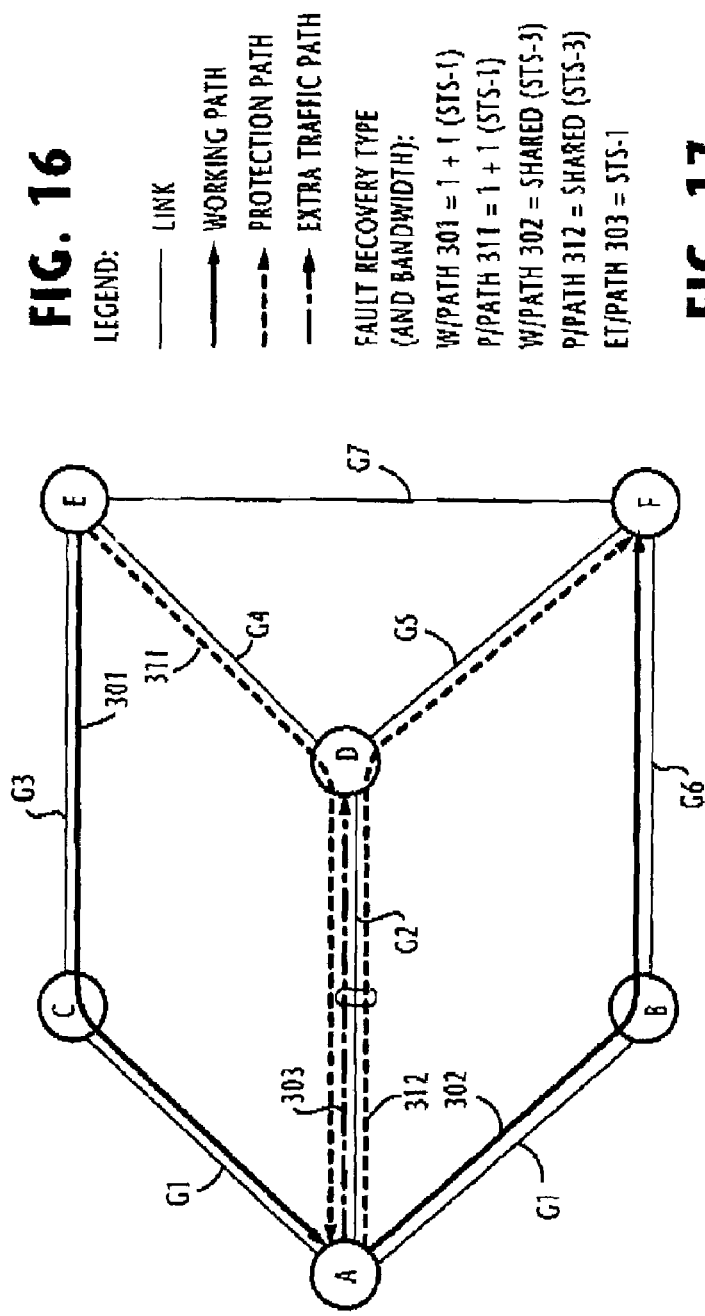
FIG. 16 a block diagram of a TDM communications network of the present invention.
Figure 17:
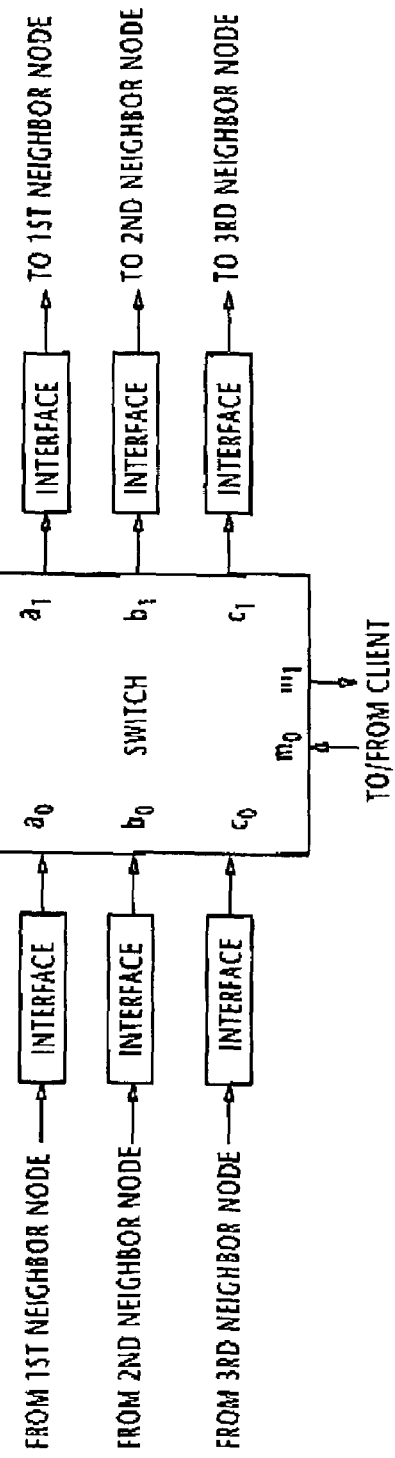
FIG. 17 is a block diagram of a network node of FIG. 16.

A communications network according to a second embodiment of the present invention is shown in FIG. 16 and the detail of node A is shown in FIG. 17. This embodiment is useful for avoiding unsuccessful fault recovery due to fragmented time-slots. In this network, instead of wavelength paths, TDM paths are established as shown in FIG. 16 which is identical in configuration to that of FIG. 1. In the illustrated example, the working and protection TDM paths 301, 311 have a bandwidth of STS-1 and the working and protection TDM paths 302, 312 have a bandwidth of STS-3. The extra traffic path 303 has a bandwidth of STS-1 which occupies a portion of the STS-3 bandwidth the shared-type protection path 312.

In FIG. 17, the switch 20 of node A has input ports $a_0$, $b_0$, $c_0$ for receiving TDM signals from neighbor nodes and output ports $a_1$, $b_1$, $c_1$ for transmitting TDM signals to neighbor nodes. Input and output ports $m_0$ and $m_1$ are connected to a client terminal.

In FIG. 18A, a port table of the node A is illustrated for mapping the port identifiers of the node to attributes which differ from the port table of FIG. 3 in that an STS-1 number is additionally included. Twelve STS-1 numbers from "0" to "11" are indicated, Since the bandwidth of working path 302 is STS-3, three STS-1 channels are mapped to the port ID=$m_0$ and the port ID=$a_1$, for example.

A path table of the node A is shown in FIG. 19. This path table differs from the path table of the first embodiment in that each of the upstream label and the downstream label is represented by a combination of a port number and an STS-1 number.

A link table of the node A is shown in FIG. 20, which differs from the link table of the first embodiment in that a field is additionally included to indicate a count number of unassigned (TDM) protection paths (UAPP). A count number UAPP is represented by a combination of an SRLG ID and the bandwidth of a requested path. In the case of link AD (FIG. 20), for example, a first count number "1" is defined for a combination of (G1+STS-3) and a second count number "1" is defined for a combination of (G6+STS-3). This indicates that if a failure occurs on a link of shared risk link group G1 or G6, a bandwidth of (STS-3)×1 is required to establish the protection path 312.

The contents of the path table and link table are derived from the port table and updated when a reservation request routine proceeds to set up a requested TDM path as follows. As described in connection with the previous embodiment, an initialization process is performed to set initial values into the path and link tables.

Figure 21B:
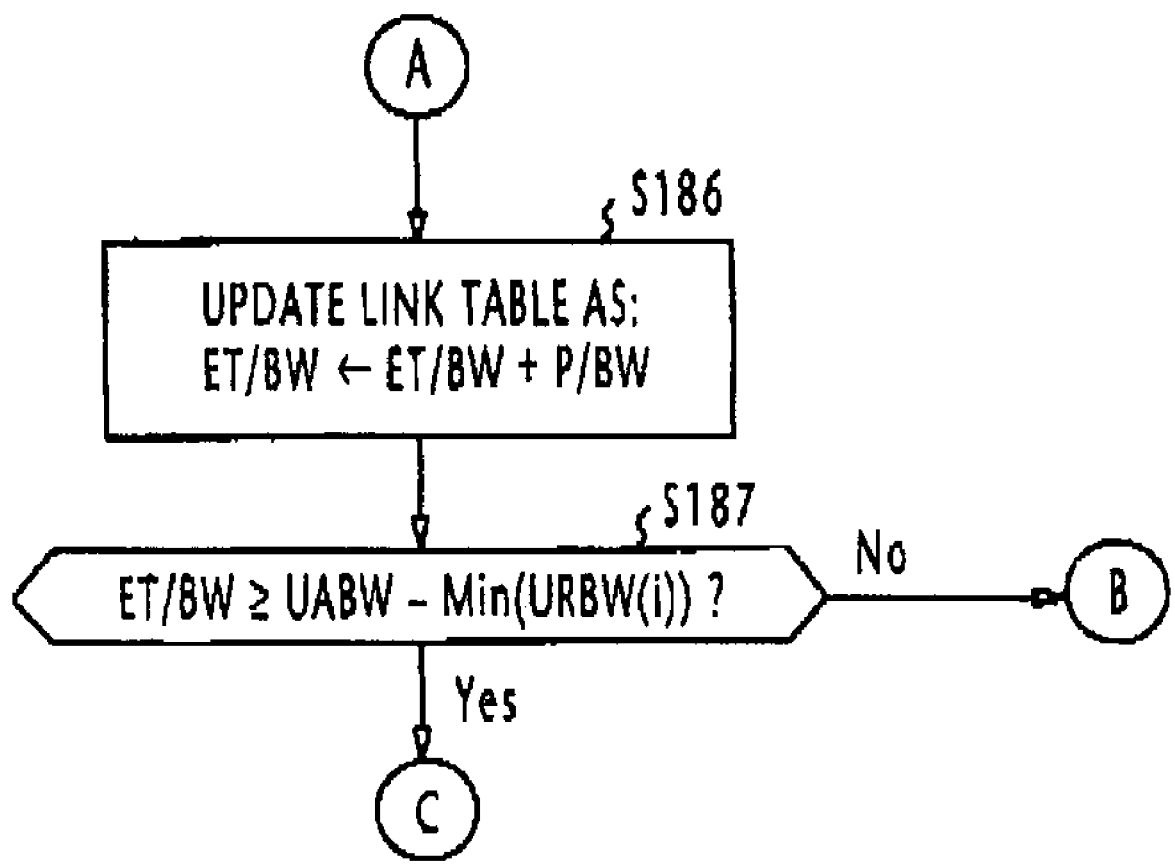

In FIG. 21A, following a route calculation process of FIG. 6, the operation of node A, as an initiation node, begins with additional initialization step S171 by setting "0" into all entries of the UAPP (count number of unassigned protection paths) field of link table (FIG. 20). At step S172, if the recovery type of the requested TDM path is extra traffic, flow proceeds to step S186 (FIG. 21B) to update the link table by summing the bandwidth of the requested path (P/BW) to the ET/BW of a downstream link and setting the sum in the ET/BW field of the detected downstream link. Therefore, in the ET/BW field of the entry of link AD (FIG. 20), the path bandwidth of STS-1 is summed to the initially set value of zero, so that this field is updated to STS-1. At decision step S187, the node A checks to see if the updated ET/BW value is equal to or greater than a difference between UABW (unassigned bandwidth) and Min (URBW ($i$)) for all SRL groups ($i$) of the network, i,e., the minimum value of unreserved bandwidth values for all SRL groups. If ET/BW is smaller than the difference value, the requested path cannot be established and flow proceeds to step S184 to restore the port table, path table and link table to the original values and reject the reservation request by generating an end-of-process code indicating that a reservation has failed (step S185). If the updated ET/BW is equal to or greater than the difference value, the requested path can be established and flow proceeds from step S187 to step S181.

If the recovery type of the requested path is other than extra traffic, flow proceeds from step S172 to step S173 to determine if the requested path is a working path or a protection path of the "1+1" recovery type. If this is the case, flow proceeds to step S174 to calculate a difference by subtracting the path bandwidth from the UABW value of the downstream link and updates the link table by setting the calculated difference value into the UABW field of the downstream link. Further, URBW (i) is updated with URBW (i)–P/BW for all SRL groups (i) of the network, and flow proceeds to step S180.

Therefore, the path bandwidth (=STS-3) of link AB is subtracted from the maximum value of STS-12 initially set in the UABW field of the entry of link AB and updated with the value STS-9 as shown in FIG. 20.

If the requested path is a protection path of 1:1 or shared type, flow proceeds from step S173 to decision step S175 to determine if the recovery type is "1:1". If this is the case, flow proceeds to step S176 to calculate URBW (i) values for all SRL groups (i) of the network and updates the link table by setting the URBW (i) field of the downstream link with the calculated URBW values. Thus, the calculated URBW values are all equal to STS-9 (i.e., =(STS-12)–(STS-3)) and bundled together and set in the URBW (i) field of the link AB entry of the link table (FIG. 20).

Flow proceeds to decision step S177 to update the link table by summing 1 to the initially set value 0 of count number and setting the sum into the UAPP field of the downstream link for all SRL groups of the network, and proceeds to step S180.

If the recovery type of the protection path is "shared", flow proceeds from step S175 to step S178 to calculate URBW (i) values for all SRL groups (i) of the SRLG list and updates the link table with the calculated values. If the shared-type protection path 312 is requested, the SRLG list contains groups G1 and G6. Thus, the path bandwidth STS-3 is subtracted from the initially set maximum value of STS-12 for each of the SRL groups G1 and G6. As a result, STS-9 is set in the URBW (i) field of link AD for each of the SRL groups G1 and G6 and the initial maximum value of STS-12 remains unchanged for other SRL groups of the network.

Flow proceeds to decision step S179 to update the link table by summing 1 to the initially set value of zero and setting the sum into the UAPP field of the downstream link for all SRL groups of the SRLG list. Therefore, the link table is updated so that the number of unassigned protection paths (STS-3 in this case) in the UAPP field of the downstream link AD is incremented to 1 for both SRL groups G1, G6 (FIG. 20).

At step S180, the node A examines the URBW field of the downstream link entry of the link table and makes a first test to determine whether the unreserved bandwidth URBW (i) for all SRL groups of the network is equal to or greater than zero and makes a second test by using the port number, STS-1 number and status fields of the path and port tables to check to see if labels can be assigned to all of the unassigned protection paths of the downstream link.

If both of the first and second tests at step S180 are not satisfied it is determined that the sum is greater than a count number which cannot be accommodated on each of the links, and flow proceeds to step S184 to restore all the tables to the original values and generates an failure-indicating end-of-process code (step S185). If both of the first and second tests at step S180 are satisfied, it is determined that the sum is greater than a count number which can be accommodated on each of the links, and flow proceeds to step S181 to determine a tunnel ID and a path ID for the requested path. At step S182, the path table (FIG. 19) is updated with the determined identifiers as well as with the bandwidth of the path and the identifier of the downstream node.

The route information produced by the route calculation of FIG. 6 contains a concatenated series of link identifiers as described above. At step S183, the link identifiers contained in the route information are shifted one position forward so that the link ID in the previous second position is shifted to the top of the series. A reservation request message is formulated with the link identifiers of the requested path and the data stored in the path table and transmitted downstream.

Figure 22B:
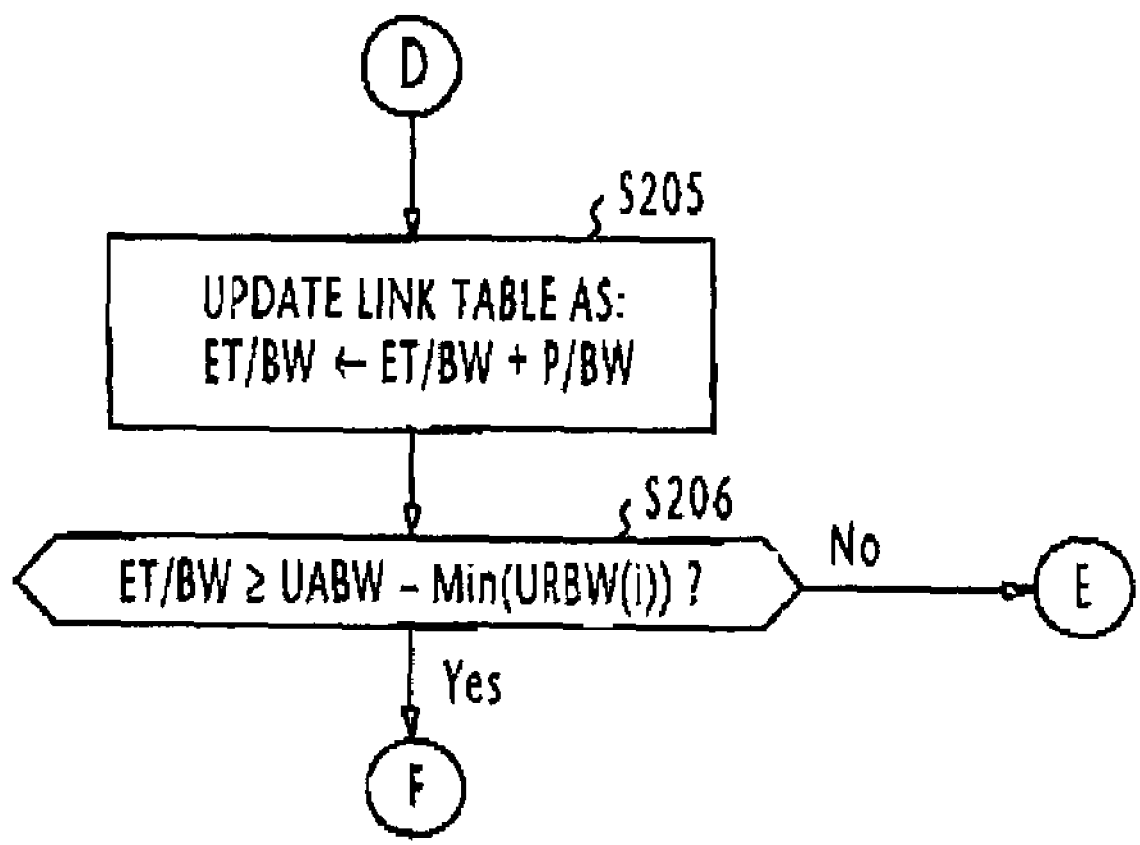

In response to the reservation request message from node A, an intermediate node operates according to the flowchart of FIGS. 22A and 22B, which is almost identical to that of FIGS. 21A, 21B, except that the tunnel ID and path ID determination step is dispensed with and the path table is updated with an upstream node identifier in addition to those with which the path table of the initiation node is updated. In FIG. 22A, steps 191 to 200 correspond in significance to steps 171 to 180 of FIG. 21A and steps 201 to 204 correspond in significance to steps S182 to S185, and in FIG. 22B, steps S205 and 206 correspond to steps 186 and 187 of FIG. 21B.

What is claimed is:

1. A path establishment method for a communications network, wherein the network comprises a plurality of nodes interconnected by links, said links forming a plurality of shared risk link groups, the method comprising:
   a) defining a plurality of unreserved bandwidths respectively corresponding to said shared risk link groups and setting a maximum bandwidth of said each link to each of the defined unreserved bandwidths as an initial value; and
   b) subtracting the bandwidth of a requested path from each of the unreserved bandwidths and rejecting the establishment of the requested path if each of the subtracted unreserved bandwidths is smaller than a predetermined threshold value,
   wherein steps (a) and (b) comprise:
   a) when a working path is requested, $a_1$) defining a plurality of unreserved bandwidths respectively corresponding to all shared risk link groups of said network, $a_2$) setting a maximum bandwidth of said each link to each of the defined unreserved bandwidths as an initial value, $a_3$) subtracting the bandwidth of the working path from each of the unreserved bandwidths, and $a_4$) rejecting the establishment of the working path if a minimum value of the subtracted unreserved bandwidths is smaller than a predetermined threshold value
   b) when a protection path of "1+1" or "1:1" recovery type is requested, $b_1$) defining a plurality of unreserved bandwidths respectively corresponding to all shared risk link groups of said network, $b_2$) setting a maximum bandwidth of said each link to each of the defined unreserved bandwidths as an initial value, $b_3$) subtracting the bandwidth of the protection path from each of the unreserved bandwidths and $b_4$) rejecting the establishment of the requested path if a minimum value of the subtracted unreserved bandwidths is smaller than said predetermined threshold value; and
   c) when a protection path of "shared" recovery type is requested, $c_1$) defining a plurality of unreserved bandwidths respectively corresponding to the shared risk link groups to which links of a corresponding working path belong, $c_2$) setting a maximum bandwidth of said each link to each of the defined unreserved bandwidths as an initial value, $c_3$) subtracting the bandwidth of the protection path from each of the unreserved bandwidths and $c_4$) rejecting the establishment of the requested path if a minimum value of the subtracted unreserved bandwidths is smaller than said predetermined threshold value.

2. The method of claim 1, further comprising the step of transmitting a signaling message from an initiation node for indicating a list of said shared risk groups, wherein step (b) defines said unreserved bandwidths according to the list contained in the signaling message.

3. The method of claim 1, wherein step (a) is performed if the fault recovery type of the working path is other than extra traffic.

4. The method of claim 1, wherein step (a) further comprises, if the fault recovery type of the working path is extra traffic, the steps of:
  summing the bandwidth of the working path to a bandwidth of the extra traffic to produce a sum;
  subtracting the minimum value of the unreserved bandwidths from an unassigned bandwidth of said each link to produce a difference; and
  rejecting the establishment of the extra traffic if said sum is smaller than said difference.

5. The method of claim 1, further comprising the steps of:
  when a failure is detected on said working path, determining whether there is a sufficient bandwidth on each of said links to be assigned to a protection path which forms a pair with said working path; and
  if said sufficient bandwidth is not present, determining whether an extra traffic is established on said each said link, deleting the extra traffic to increase the bandwidth of said each link that can be assigned to said protection path.

6. The method of claim 3, further comprising the steps of broadcasting a link state advertisement message from said initiation node for indicating an unassigned bandwidth for extra traffic, said unassigned bandwidth being equal to UABW−Min (URBW (i))−ET/BW,
  where, UABW=an unassigned bandwidth of said each link, $$\text{Min}(URBW(i)) = \text{a minimum value of said unreserved bandwidths respectively corresponding to all shared risk link groups, and}$$

ET/BW=the bandwidth of said extra traffic.

7. The method of claim 6, further comprising the step of, responsive to said link state advertisement message, performing a route calculation by using links on each of which said unassigned bandwidth indicated in said link state advertisement message is greater than the bandwidth of a working path established on each of said links.

8. The method of claim 1, further comprising the steps of defining a count number representing a combination of one of said shared risk link groups and a requested bandwidth and setting zero to said count number as an initial value, wherein each of said working and protection paths is a TDM (time-division multiplex) path, and
  wherein step (b) further comprises the steps of:
  when said path is requested, adding 1 to said count number of each of said shared risk link groups of said network at each link of the requested protection path to produce a sum, and rejecting the establishment of the requested protection path if said sum is greater than a count number which can be accommodated on each of said links, and wherein step (c) further comprises the steps of:
  when said path is requested, adding 1 to said count number of a list of said shared risk link groups to which the links of a corresponding working path of the protection path belong to produce a sum, and rejecting the establishment of the requested protection path if said sum is greater than a count number which can be accommodated on each of the links of said corresponding working path.

9. The method of claim 1, further comprising the steps of defining, for each of said links, a maximum value of said unreserved bandwidths and a less-than-maximum value of said unreserved bandwidths and using the defined values when establishing a protection path in the event of a failure on a working path.

10. The method of claim 9, further comprising the steps of:
  defining an assigned shared protection bandwidth for a protection path on each link of the protection path and setting an initial value of zero to the defined protection bandwidth;
  in the event of a failure of a shared recovery type working path which forms a pair with said protection path, summing the bandwidth of the protection path to said assigned shared protection bandwidth on each link of said protection path; and
  assigning a requested bandwidth to said protection path if said summed bandwidth is equal to or smaller than a difference between said maximum value of said unreserved bandwidths and a minimum value of said unreserved bandwidths.

11. A network node of a communications network in which the network node is one of a plurality of network nodes, wherein the network nodes are interconnected by links having shared risk link groups, comprising:
  a memory for defining a plurality of unreserved bandwidths respectively corresponding to said shared risk link groups and setting a maximum bandwidth of said each link to each of the defined unreserved bandwidths as an initial value; and
  a controller for subtracting the bandwidth of a requested path from each of the unreserved bandwidths and rejecting the establishment of the requested path if each of the subtracted unreserved bandwidths is smaller than a predetermined threshold value,
  wherein the controller, when a working path is requested, defines a plurality of unreserved bandwidths respectively corresponding to all shared risk link groups of said network, sets a maximum bandwidth of said each link to each of the defined unreserved bandwidths as an initial value, subtracts the bandwidth of the working path from each of the unreserved bandwidths, and rejects the establishment of the working path if a minimum value of the subtracted unreserved bandwidths is smaller than a predetermined threshold value,
  wherein the controller, when a protection path of "1+1" or "1:1" recovery type is requested, defines a plurality of unreserved bandwidths respectively corresponding to all shared risk link groups of said network, sets a maximum bandwidth of said each link to each of the defined unreserved bandwidths as an initial value, subtracts the bandwidth of the protection path from each of the unreserved bandwidths and rejects the establishment of the requested path if a minimum value of the subtracted unreserved bandwidths is smaller than said predetermined threshold value; and wherein the controller, when a protection path of "shared" recovery type is requested, defines a plurality of unreserved bandwidths respectively corresponding to the shared risk link groups to which links of a corresponding working path belong, set a maximum bandwidth of said each link to each of the defined unreserved bandwidths as an initial value, subtracts the bandwidth of the protection path from each of the unreserved bandwidths and rejects the establishment of the requested path if a minimum value of the subtracted unreserved bandwidths is smaller than said predetermined threshold value.

12. The network node of claim 11, wherein the controller transmits a signaling message from an initiation node for indicating a list of said shared risk groups and defines the unreserved bandwidths according to the list contained in the signaling message.

13. The network node of claim 11, wherein the controller, if the fault recovery type of the working path is extra traffic type, sums the bandwidth of the working path to a bandwidth of the extra traffic to produce a sum, subtracts the minimum value of the unreserved bandwidths from an unassigned bandwidth of said each link to produce a difference, and rejects the establishment of the extra traffic if said sum is smaller than said difference.

14. The network node of claim 11, wherein the controller, when a failure is detected on said working path, determines whether there is a sufficient bandwidth on each of said links to be assigned to a protection path which forms a pair with said working path, and if said sufficient bandwidth is not present, determines whether an extra traffic is established on said each link, and deletes the extra traffic to increase the bandwidth of said each link that can be assigned to said protection path.

15. The network node of claim 12, wherein the controller broadcasts a link state advertisement message from said initiation node for indicating an unassigned bandwidth for extra traffic, said unassigned bandwidth being equal to UABW−Mm (URBW (i))−ET/BW, where, UABW=an unassigned bandwidth of said each link, $$\mathrm{Min}(URBW(i)) = \text{a minimum value of said unreserved bandwidths respectively corresponding to all shared risk link groups, and}$$

ET/BW=the bandwidth of said extra traffic.

16. The network node of claim 15, wherein the controller, responsive to a link state advertisement message, performs a route calculation by using links on each of which said unassigned bandwidth indicated in said link state advertisement message is greater than the bandwidth of a working path established on each of said links.

17. The network node of claim 12, wherein the controller defines a count number in said memory representing a combination of said shared risk link groups and a requested bandwidth and sets zero to the count number as an initial value, wherein each of said working and protection paths is a TDM (time-division multiplex) path, and wherein the controller, when a protection path of "1+1" or "1:1" recovery type is requested, adds 1 to the count number of each of said shared risk link groups of said network at each link of the requested protection path to produce a sum, and rejects the establishment of the requested protection path if said sum is greater than a count number which can be accommodated on each of said links, and wherein the controller, when a protection path of "shared" recovery type is requested, adds 1 to said count number of a list of said shared risk link groups to which the links of a corresponding working path of the protection path belong to produce a sum, and rejects the establishment of the requested protection path if said sum is greater than a count number which can be accommodated on each of the links of said corresponding working path.

18. The network node of claim 11, wherein the controller is arranged to:

define, for each of said links, a maximum value of said unreserved bandwidths and a less-than-maximum value of said unreserved bandwidths, and use the defined values when establishing a protection path in the event of a failure on a working path.

19. The network node of claim 18, wherein said controller is arranged to:

define an assigned shared protection bandwidth for a protection path on each link of the protection path, set an initial value of zero to the defined protection bandwidth, sums the bandwidth of the protection path to said assigned shared protection bandwidth on each link of said protection path in the event of a failure of a shared recovery type working path which forms a pair with said protection path, and assign a requested bandwidth to said protection path if said summed bandwidth is equal to or smaller than a difference between said maximum value of said unreserved bandwidths and a minimum value of said unreserved bandwidths.

20. The method of claim 3, wherein step (a) further comprises, if the fault recovery type of the working path is extra traffic, the steps of:

summing the bandwidth of the working path to a bandwidth of the extra traffic to produce a sum;

subtracting the minimum value of the unreserved bandwidths from an unassigned bandwidth of said each link to produce a difference; and rejecting the establishment of the extra traffic if said sum is smaller than said difference.

* * * * *